(12) United States Patent
Deruginsky et al.

(10) Patent No.: US 8,295,512 B2
(45) Date of Patent: Oct. 23, 2012

(54) MICROPHONE WITH VOLTAGE PUMP

(75) Inventors: Michael Deruginsky, Hillerod (DK);
Claus Erdmann Fuerst, Roskilde (DK);
Mohammad Shajaan, Vaerlose (DK);
Daifi Sassene, Vaerlose (DK)

(73) Assignee: Analog Devices, Inc., Norwood, MA (US)

( * ) Notice: Subject to any disclaimer, the term of this patent is extended or adjusted under 35 U.S.C. 154(b) by 956 days.

(21) Appl. No.: 12/123,213

(22) Filed: May 19, 2008

(65) Prior Publication Data
US 2008/0219474 A1 Sep. 11, 2008

Related U.S. Application Data

(63) Continuation of application No. 10/596,125, filed as application No. PCT/DK2004/000837 on Dec. 1, 2004, now Pat. No. 7,391,873.

(60) Provisional application No. 60/525,826, filed on Dec. 1, 2003.

(51) Int. Cl.
*H04R 3/00* (2006.01)

(52) U.S. Cl. ............ 381/113; 381/111; 381/91; 381/92; 381/95; 381/122; 381/173; 381/174

(58) Field of Classification Search .............. 381/91–92, 381/111–115, 122, 173–174, 178, 375, 95; 330/252, 85, 96, 136
See application file for complete search history.

(56) References Cited

U.S. PATENT DOCUMENTS

| 4,258,332 | A | * | 3/1981 | West | 330/297 |
| 4,539,440 | A | * | 9/1985 | Sciarra | 381/329 |
| 4,541,112 | A | | 9/1985 | Kern et al. | |
| 5,043,686 | A | * | 8/1991 | Plunkett | 333/181 |
| 5,352,936 | A | | 10/1994 | Allen | |
| 5,377,273 | A | * | 12/1994 | Sutton | 381/122 |
| 5,490,220 | A | | 2/1996 | Loeppert | |
| 5,675,279 | A | * | 10/1997 | Fujimoto et al. | 327/536 |
| 6,150,875 | A | * | 11/2000 | Tsinker | 327/552 |
| 6,424,480 | B1 | * | 7/2002 | Bhandari et al. | 360/67 |
| 6,697,493 | B1 | * | 2/2004 | Kern | 381/111 |
| 6,771,122 | B2 | * | 8/2004 | Jin et al. | 330/69 |
| 7,372,967 | B2 | * | 5/2008 | Henson et al. | 381/111 |

(Continued)

FOREIGN PATENT DOCUMENTS
EP 0562738 9/1993
(Continued)

OTHER PUBLICATIONS

John F. Dickson: On-Chip High Voltage Generation in MNOS Integrated Circuits Using an Improved Voltage Multiplier Technique (5 pages).

*Primary Examiner* — Goins Davetta
*Assistant Examiner* — Disler Paul
(74) *Attorney, Agent, or Firm* — Kenyon & Kenyon LLP

(57) ABSTRACT

An integrated circuit configured to provide a microphone output signal, comprising: a preamplifier coupled to receive an input signal, generated by either a first microphone member or a second microphone member, where one of the members is movable relative to the other microphone member; a voltage pump to output a pumped voltage; and a low-pass filter coupled to filter the pumped voltage from the voltage pump and to provide a bias voltage to either microphone member.

32 Claims, 14 Drawing Sheets

U.S. PATENT DOCUMENTS

| | | | |
|---|---|---|---|
| 7,620,189 B2 * | 11/2009 | Lang et al. | 381/113 |
| 2002/0008262 A1 | 1/2002 | Yoshida | |
| 2002/0071578 A1 | 6/2002 | Van Der Zwan et al. | |
| 2003/0007650 A1 * | 1/2003 | Akino | 381/113 |
| 2003/0133588 A1 | 7/2003 | Pedersen | |
| 2003/0235315 A1 | 12/2003 | Reesor | |
| 2004/0001600 A1 * | 1/2004 | Kim et al. | 381/100 |
| 2004/0120540 A1 * | 6/2004 | Mullenborn et al. | 381/322 |
| 2004/0202336 A1 * | 10/2004 | Watson et al. | 381/92 |
| 2006/0067544 A1 * | 3/2006 | Moraghan | 381/113 |

FOREIGN PATENT DOCUMENTS

| | | |
|---|---|---|
| GB | 1248843 | 10/1971 |
| WO | 2004/057909 | 7/2004 |

\* cited by examiner

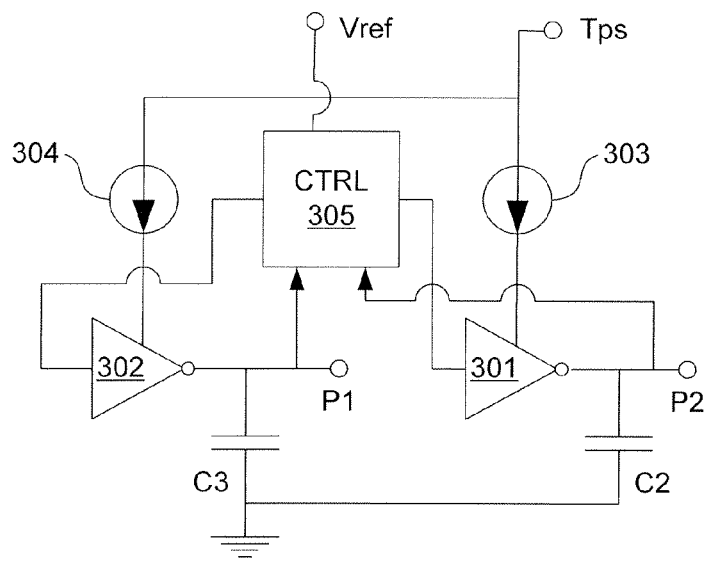
*Fig. 3*
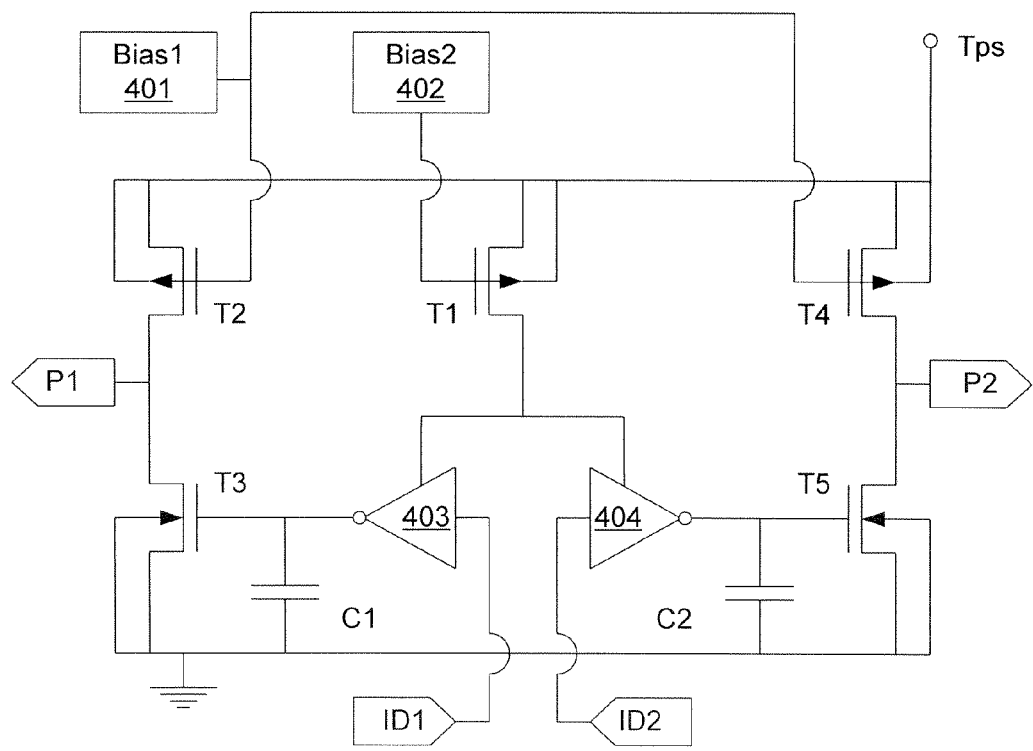
*Fig. 4*
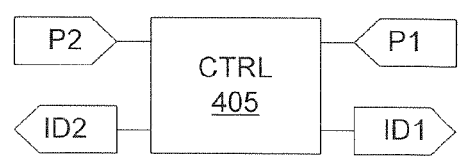

MICROPHONE WITH VOLTAGE PUMP

This invention relates to an integrated circuit with a voltage pump and a microphone preamplifier.

BACKGROUND

For many years the preferred type of microphone for telecom applications (ie Mobile phones) has been electret microphones. This type of microphone is based on the principle of a capacitor which is formed by a movable member that constitutes a membrane of the microphone and another member, eg a so-called back plate of the microphone. One of the members of the microphone, preferably the membrane, is provided with a captured electrical charge also known as an electret layer.

However, in recent years microphones are also provided with the charge by a DC voltage source during operation. These microphones comprise ordinary condenser microphones and MEMS microphones which are on their way to be utilized in telecom applications.

Microphones without an electret layer can be implemented in two different ways. That is, on the one hand, in the conventional way where the parts are manufactured as metal parts for mounting in a case (which normally forms both a capacitor plate of the microphone and a backplate).

On the other hand, in recent years also silicon usually used for integrated circuits have been used for the manufacture of mechanical structures. This technology is usually denoted MEMS. The differences between manufacture of microphones in MEMS technology and conventional technology are mainly the processes involved and the tolerances. I.e. MEMS technology requires clean rooms and silicon technologies. The precision is higher for silicon technologies but so is the cost.

The characteristics of the two types of microphones are that the microphone capacitances are usually smaller and the required bias voltages are smaller. This is due to the fact that microphones implemented in silicon have to be smaller to be able to compete cost-wise. This means that the silicon microphones are optimized differently even though the principle of the two microphone types is the same. I.e. the membrane area of a silicon microphone is typically 1 mm^2, airgap 1-2 um, capacitance 1 pF and bias voltage 10V. And for a conventional microphone it is area=3 mm^3, airgap=10-15 um, capacitance 3 pF and bias voltage 30-40V. Or even larger bias voltage.

As the charge on the microphone capacitor has to be kept constant to maintain proportionality between sound pressure and voltage across the capacitor members, it is important not to introduce any de-charging of the microphone.

Therefore, in order to pick up a microphone signal from the capacitor, amplifiers configured with the primary objective of providing high input resistance are preferred to buffer the capacitor from circuits which are optimized for other objectives. The amplifier connected to pick up the microphone signal is typically denoted a preamplifier or a buffer amplifier or simply a buffer. The preamplifier is typically connected physically very close to the capacitor—within a distance of very few millimetres or fractions of millimetres.

For small-sized microphones only a very limited amount of electrical charge can be stored on one of the microphone members. This furthers the requirement for high input resistance. Consequently, the input resistance of preamplifiers for small-sized microphones has to be extremely high—in the magnitude of Giga ohms. Additionally, the input capacitance of this amplifier has to be very small in order to achieve a fair sensitivity to sound pressure. Telecom microphones with an integrated preamplifier are sold in high volumes and at very low prices. As the cost of an amplifier for a telecom microphone is directly related to the size of the preamplifier chip die, it is important, for the purpose of reducing price, that the preamplifier die is as small as possible.

So, obviously, there is a need for microphone preamplifiers with gain and very low input capacitance, and the lowest possible preamplifier die area. Additionally, low noise is important. Low noise is important as noise can be traded for area—ie if the circuit has low noise and a noise lower than required, this noise level overhead can be traded for lower chip die area and it is thus possible to manufacture the preamplifier at lower cost.

However, since sensitivity is traded for low prise, microphones for telecommunications purpose are less sensitive. From a market perspective, there is a demand for a larger sensitivity of the microphone and preamplifier in combination. So therefore the gain in the preamplifier is to be increased to meet the demand. Additionally, there is a demand for low noise in the audible range. Moreover, in order to ensure a good signal-to-noise ratio while meeting the demand for a relatively large sensitivity, the input capacitance of the preamplifier must be small to avoid an unnecessary signal loss from the microphone (cf. the equivalency of the microphone signal being exposed to a voltage divider constituted by the capacitances).

Since the chip area occupied by the preamplifier must be as small as possible to obtain relatively low cost, the preamplifier must be as small as can be. Therefore, since amplifier configurations known from hearing aids are generally not optimised for chip area to the same extent, these configurations are not applicable. Further, one should bear in mind that buffers or amplifiers applied in hearing aids are not configured to provide such high gain levels as are required for the low-sensitivity microphones used in telecommunication applications. In hearing aids chips more space is required for the same noise performance since buffers are required to avoid overload in hearing aids.

The charge on the microphone capacitor can be provided by a relatively high DC supply voltage or by a manufacturing process where a static charge is captured on one of the capacitor members eg on the membrane which can made from Teflon. The type of microphone where a static charge has been applied is preferred in telecom applications since this type does not require a circuit for supplying the charge by a DC voltage. However, this type has been found shown to lose the charge when exposed to relatively high temperatures. Additionally, such microphones require careful handling and mounting during eg a soldering process which inherently exposes the microphone to high temperatures. When the microphone has lost its static charge, the microphone's ability as a sound transducer is diminished and it will be far too inexpedient to re-establish the charge.

Noise is also an important parameter for telecom microphones. Typically, the predominant noise sources are related to the preamplifier in the microphone. But when switching and/or oscillating circuits are incorporated on the chip die, surrounding/neighbouring circuits/circuit paths with transient signals can become major noise sources. Additionally, when a noisy signal is transmitted on the same path or terminal as another signal, eg the microphone signal, this noisy signal will constitute a major and direct noise source of which the noise influence may be difficult to suppress.

When designing a preamplifier in CMOS technology for a microphone there is normally three noise sources. These sources are noise from a bias resistor, 1/f noise from an input transistor, and white noise from the input transistor. We assume that input transistor noise dominates. Both white noise and 1/f noise can be minimized by optimization of the length and the width of the input transistor(s). This applies for any input stage, eg a single transistor stage or a differential stage. The noise from the bias resistor can also be minimized. If the bias resistor is made very large the noise from the resistor will be high pass filtered and the in-band noise will be very low. This has the effect, though, that the lower bandwidth limit of the amplifier will be very low. This can be a problem as the input of the amplifier will settle at a nominal value only after a very long period of time after power-up. Additionally, signals with intensive low frequency content arising form eg slamming of a door or infra sound in a car can overload the amplifier. Another related problem is small leakage currents originating from mounting of the die inside a microphone module. Such currents will due to the extreme input impedance establish a DC offset. This will reduce the overload margin of the amplifier.

PRIOR ART

US 2003/0235315-A1 discloses a digital microphone comprising an electret condenser microphone, a preamplifier, a limiter and a sigma-delta modulator to provide a digital output bit stream which is responsive to a sound pressure on the electret microphone. The sigma-delta modulator provides a single bit stream output at a high (oversampled) bit rate. The preamplifier, limiter, and sigma-delta converter is implemented on an integrated circuit using larger geometry analog IC technology. The microphone is utilized in a cellular phone.

US 2002/0071578 discloses a microphone comprising in its housing an electret condenser microphone and a preamplifier of the JFET type. The preamplifier is integrated on a first integrated circuit and provides a microphone output signal to a second but external integrated circuit. The output signal is coupled to an input integrator of a sigma-delta A/D converter on the second but external integrated circuit. The input integrator provides biasing for the JFET.

SUMMARY OF THE INVENTION

There is provided an integrated circuit configured to provide a microphone output signal, comprising: a preamplifier coupled to receive an input signal, generated by a first microphone member that is movable relative to a second microphone member; and a voltage pump to provide a bias voltage to either microphone member.

Consequently, since sensitivity a microphone is closely related to the charge provided on one of the microphone members a microphone output signal which is more sensitive to a sound pressure on one of the microphone members is provided. In combination therewith the microphone output signal is provided by a preamplifier which provides the output signal as a buffered output signal with a desired gain.

Since the preamplifier and the voltage pump is embodied as a integrated circuit on a semiconductor substrate, close integration of a microphone element and the integrated circuit is possible. Additionally, the versatility of a microphone integrated with the preamplifier and the voltage pump is increased since other circuit systems, providing electrical operating conditions for the microphone and further signal processing of the microphone output signal, does not need to provide a high bias voltage to the microphone. This is a major improvement since bias voltages are significantly higher than common nominal voltage levels of integrated circuit technologies. Bias voltages can be as high as 10, 20 up to around 60 volts, whereas common nominal voltage levels are about 3 or 5 volts.

Expediently, the integrated circuit is configured with an oscillator driven voltage pump to provide a bias voltage to either microphone member; and the oscillator is configured to draw substantially equal levels of current across signal cycles provided by the oscillator. Thereby, especially when the microphone output signal and the operating power is provided via a shared terminal (and path), the quality of the microphone signal is improved. This is achieved since the oscillator draws a more constant level of current. Otherwise the microphone output signal would be level-shifted as the oscillator would draw different levels of current from half-cycle to half-cycle. Additionally, the oscillator will generate less switching noise.

In an expedient embodiment, the oscillator comprises paths with elements that can be charged with an electrical charge and where the paths are controlled by the oscillator to charge the different elements of the different paths alternately by a current drawn from a common source. The elements, in the form of capacitors, are charged alternately and coupled to level sensitive triggers for providing 180 degrees phase shifted, square formed oscillator signals.

Preferably, the voltage pump has a first pump stage at which an oscillating signal with a voltage pulse level is pumped to a higher voltage pulse level, and a second pump stage at which a voltage level is pumped to a higher level by means of a circuit operating on the oscillator signal, provided at the first stage, with the higher voltage pulse level. Thereby an area efficient voltage pump is provided. Especially for telecom microphones this is an important parameter.

The integrated circuit can comprise a first portion configured with a circuit component layout for electrical operation at or below a nominal voltage level and a second portion configured with a circuit component layout for electrical operation above the nominal voltage. The first portion is also denoted a low voltage section and the second portion is denoted a high voltage section. Components in the high voltage portion are larger than the components in the low voltage portion. The cross-portion implementation of the voltage pump provides for more chip area efficient implementation of the pump.

When the pulse amplitude of oscillator signals provided at the low voltage section are substantially equal to the nominal voltage of the low voltage section, the high voltage part can be configured with simple voltage pumps. This gives the advantage of enabling implementation of the pump using cost efficient parasitic components which can withstand the high voltage.

Generally, in an integrated circuit it is cumbersome to provide feedback involving voltages substantially above a nominal operating voltage. Therefore, in an expedient embodiment, the output signal of the first voltage pump stage is provided as a feedback signal to a circuit which provides a regulated voltage pulse level of the signals output from the first pump stage. Thereby, it is possible to provide a relatively precise bias voltage by means of a feedback configuration operating a lower voltages.

Preferably, the voltage pump has a first pump stage providing an intermediate bias voltage and a second pump stage providing the bias voltage from the intermediate bias voltage; and the second pump stage comprises a voltage pump configured as a Dickson converter. The Dickson converter provides low noise, low ripple on its output signal when it has reached a stable state and is capacitively loaded (by a microphone). Further, it has a simple circuit configuration and requires small area for implementation.

Expediently, an output signal of the voltage converter of the Dickson type is provided as a feedback signal to a circuit which provides a regulated voltage pulse level of oscillator signals operating the voltage converter. Thereby, a simple feedback configuration is provided.

When multiple voltage converters are cascaded very high voltages (above e.g. 20 or 30 volts) can be provided. However, since the multiple voltage converters are simple in their configuration in order to provide chip area and cost efficient voltage pumps, the bias voltage can vary significantly from chip die to chip die. Thus, preferably multiple voltage converters are cascaded to provide the bias voltage, and a further voltage converter, which matches the first converter in the cascade, is coupled to receive the same signal as the first converter and to provide a feedback signal to a circuit which maintains a fixed voltage level of the signals output from the further voltage converter. Thereby the further converter and the first converter is coupled as a master slave configuration. Since the master/slave converters can be made almost identical a feedback loop enclosing a portion of the cascade is provided. Thereby, provided bias voltages can be controlled much better from chip die to chip die.

The integrated circuit can be implemented by various IC technologies, however, high voltage components required for voltage pumps require larger spacing, deeper-wells, thicker gate oxide etc. Technologies with such components exists but they are expensive and are generally not available for low cost telecom applications. But when the voltage pump comprises capacitors implemented as Metal capacitors, standard technologies can be utilized. These components are based on parasitics and are thus not very precise and well controlled. But the use of such components is successful if the simple Dickson multiplier is implemented.

Correspondingly, in a preferred embodiment the voltage pump comprises diodes implemented as Poly-diodes.

Still correspondingly, in a preferred embodiment the voltage pump comprises diodes implemented as diffusion diodes in an N-well.

The intrinsic sensitivity of telecom microphones are normally relatively low despite being provided with a relatively high bias voltage. As a consequence of this the preamplifier requires gain. Furthermore high sensitivity is required. The consequence of this is that higher gain should be provided by the pre-amplifier. However, it is desired to provide high overload margins and the ability to handle large low frequency signals such as car rumbling and door slamming. Additionally, low frequency signals can comprise pulses generated by start-up of the voltage pump.

To meet these demands a preamplifier is provided which comprises a differential input stage with a first and a second input terminal and an output stage with an output terminal; a feedback circuit, with a low-pass frequency transfer function, coupled between the output terminal and the first input terminal and integrated on the semiconductor substrate; and where the second input terminal provides an input for a microphone signal.

Thereby a semiconductor microphone preamplifier is provided with a filter feedback configuration. This preamplifier can provide a large loop-gain outside the audio band and will give rise to very little distortion in the audio band. But more importantly, inter-modulation distortion introduced by frequency components at low frequencies, outside the audio band, will be very low. The loop-gain characteristic provided by the feed-back configuration provides e.g. lower distortion.

Preferably, the feedback circuit is a filter with a transfer function, in the frequency domain, with a zero and a pole; wherein the zero is located at a higher frequency than the pole.

Expediently, the preamplifier has a transfer function, in the frequency domain, with a zero and a pole; wherein the pole is located in the range 0.1 Hz to 50 Hz or 0.1 Hz to 100 Hz or 0.1 to 200 Hz.

The feedback circuit can be configured as a filter which, in the frequency domain, has a relatively high gain level below a transition frequency range and a relatively low gain level above the transition frequency range.

In an expedient embodiment, the integrated circuit comprises a DC blocking capacitor coupled to diminish a DC voltage at the input of the preamplifier, which DC voltage originates from biasing the first or second microphone member.

Preferably, the integrated circuit further is configured with an analogue-to-digital converter; and the voltage pump and the analogue-to-digital converter are driven by a common clock-signal. Thereby an external clock signal provided for reading out digital bits of the A/D converter can be utilized as a clock signal for driving the voltage pump.

BRIEF DESCRIPTION OF THE DRAWING

The invention will be described in more detail in connection with the drawing in which:

FIG. 3 shows a first oscillator with constant current consumption;

FIG. 4 shows a second oscillator with constant current consumption;

DESCRIPTION OF PREFERRED EMBODIMENTS

Figure 1:
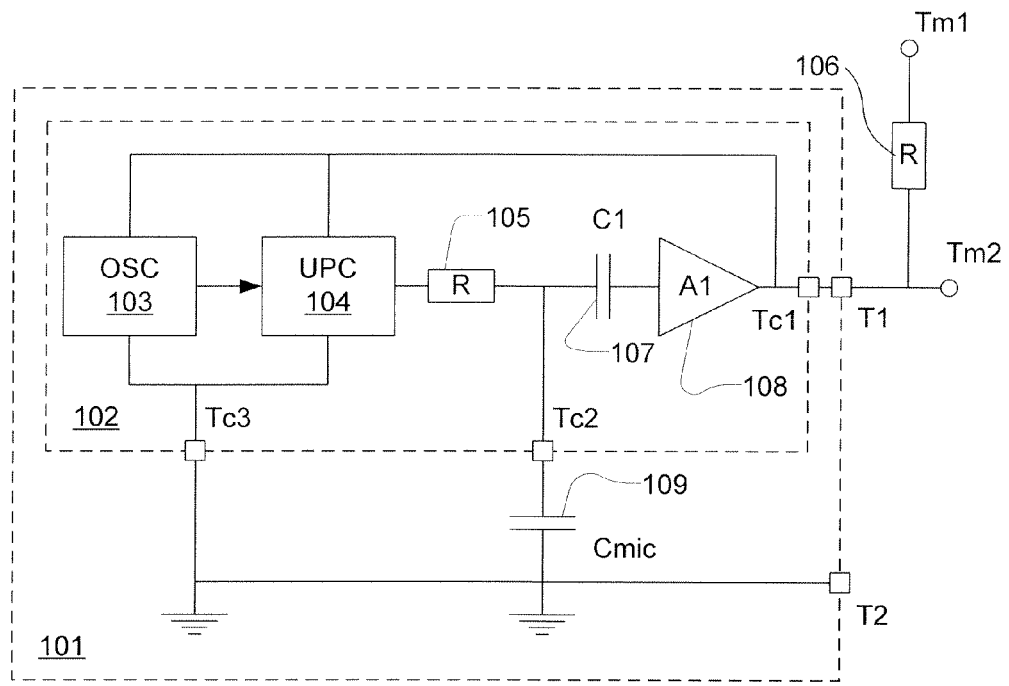
FIG. 1 shows a microphone comprising an integrated circuit with a voltage pump.

FIG. 1 shows a microphone comprising an integrated circuit with a voltage pump. The microphone 101 is a compound unit with a microphone element 109 and an integrated circuit 102. The integrated circuit 102 is implemented as a single chip die manufactured by a solid-state diffusion process on a semiconductor substrate. The microphone element is formed by a movable member, which constitutes a membrane of the microphone, and another member, thereby allowing the membrane to move relative to the other member in response to a sound pressure acting on the membrane. A sound pressure detected by the microphone will cause the membrane to move and consequently change the capacitance of the capacitor formed by the membrane member and the other member. If the charge on the capacitor formed by these two members is kept constant, the voltage across the two capacitor members will vary with the sound pressure.

The integrated circuit 102, implemented as a single chip die, is closely integrated with the microphone element 109. The close integration of the microphone element 109 and the integrated circuit 102 is provided by integration of the microphone element and the chip die in a small-sized microphone cartridge.

The microphone 101 comprises two terminals T1 and T2 which is a ground terminal and a combined microphone signal and power supply terminal, respectively. The terminals T1 and T1 are used for coupling the microphone (situated in a cartridge) with power supply means and further signal processing circuits. Such signal processing circuits are typically integrated as part of a so-called system-on-chip (SOC) device using IC technology.

The microphone comprises a microphone element 109 illustrated by the capacitor, Cmic, and an integrated circuit 102. The integrated circuit 102 comprises three terminals Tc1, Tc2, Tc3 which is a combined microphone signal and power supply terminal, a combined DC voltage level for providing a constant charge on the microphone and a microphone element signal, and a ground terminal, respectively.

The integrated circuit 102 comprises a voltage up-converter or voltage pump, UPC, 104 e.g. in the form of a so-called Dickson-converter. The voltage pump is operated by an oscillator 103 which preferably provides a square-wave oscillator signal to the voltage pump. Other signals, eg sine waves or filtered square waves, with lower contents of harmonics may be used to obtain lower noise. The oscillator 103 and the voltage pump 104 are powered by a current drawn through terminal Tc1 (T1) which is coupled to a nominal supply voltage via a series resistor 106, R.

In response to the oscillator signal the voltage pump 204 provides a pumped voltage which exceeds the nominal supply voltage. A nominal voltage is e.g. 3 or 5 volts and a pumped voltage is e.g. 10, 12, 15, or 20 volts. However, higher voltage levels (e.g. up to about 60 volts or more) can be provided as described later. The pumped voltage is considered a DC voltage, but it is superposed by (strong) noise components originating from the oscillator signal on which the voltage pump operates.

The pumped voltage is supplied to a first member of the microphone element 109 via a series resistor 105, R. The second member of the microphone element 109 is coupled to the ground reference. Thereby the voltage pump provides a constant electrical charge on the microphone element. Typically, the first member is the membrane of the microphone.

When a sound pressure acts on the membrane, a microphone element signal is generated at the membrane relative to the second member. The microphone element signal is superposed on the pumped voltage provided via the resistor 105, R. In order to reduce the DC voltage load of the input stage of the preamplifier 108, A1 the capacitor 107, C1 is coupled as a DC block. To avoid an unacceptable signal loss the capacitor C1 should have a capacity larger than approximately ten times the capacity of the microphone element 109.

The preamplifier 108, A1 is powered by drawing an operating current through its output via terminal Tc1 (which is coupled to a nominal supply voltage via a series resistor 106, R). The preamplifier receives an input signal and provides an output signal at its output. The preamplifier is configured as a simple buffer amplifier or as an amplifier providing a gain of more than 0 db. The preamplifier is alternatively configured to provide an expedient frequency dependent gain response; this will be described in the following.

Reverting to the issue of noise generated by the voltage pump 104 and the oscillator 103 the following applies: As the voltage pump is an electronic circuit it will generate both 1/f noise and white noise and as the voltage pump is a switched circuit it will also generate (high frequency) switch noise. The switch noise is predominant at harmonics of the switch frequency of the oscillator. The switch frequency of the oscillator is designed to be larger than the upper cut-off frequency (e.g. 20 KHz) of the pass-band in the transfer function from the microphone element to the microphone output terminal (T1). Typical oscillator frequencies are 200 KHz, 500 KHz or 1 MHz.

The effect of all the noise sources of the charge pump can be diminished by a low pass filter. This is the most efficient way of reducing the effect of the noise. Reducing the 1/f and the white noise sources themselves will require excessive area and/or current consumption. The low pass filter is embodied by means of the resistor 105, R and the capacitor component of the microphone element 109. The cut-off frequency of the low pass filter 105, 109 affects the pass-band in the transfer function from the microphone element to the microphone output terminal (T1). Preferably, the cut-off frequency of the low pass filter 105, 109 is substantially equal to a lower cut-off frequency (e.g. 20 Hz) of the pass-band in the transfer function from the microphone element to the microphone output terminal (T1). The cut-off frequency of the low-pass filter 105 is preferably located at a frequency below the well-known A-weighing curve.

In an embodiment the microphone element Cmic is coupled as an electrically floating device. This is embodied by interchanging the coupling capacitor 107 and the microphone element 109. It is within the skills of a skilled person to arrange the necessary change of the circuit and terminals layout.

Figure 2:
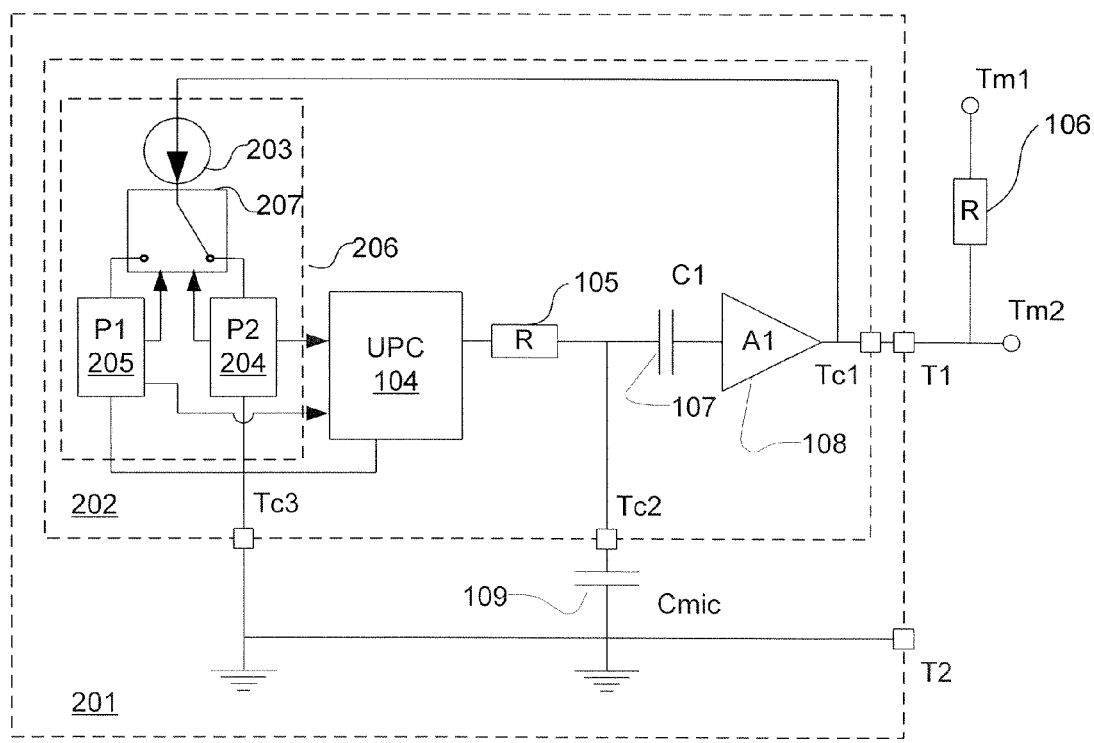
FIG. 2 shows a microphone comprising an integrated circuit with a voltage pump operated by a constant current drawing oscillator.

FIG. 2 shows a microphone comprising an integrated circuit with a voltage pump operated by a constant current drawing oscillator. In this embodiment the oscillator 206 is configured to draw equal levels of current across multiple half-cycles of the oscillator signal provided by the oscillator 206. Thereby, a more even and less noisy operating current is drawn through the combined microphone output and power terminal Tc1 (T1).

The oscillator 206 comprises a constant current source 203 and a first circuit path 205 and a second circuit path 204 which alternately charges and discharges a capacitor by alternately drawing current from the constant current source 203. A voltage level sensitive element e.g. a comparator or Schmitt-trigger provides digital output oscillator signals P1 and P2 to the voltage pump 104. A switch 207 is preferably applied to direct current from the constant current source 203 either through the path 205 or through the path 204. The switch is controlled by respective signals from the paths 204 and 205. Preferably, the output signals P1 and P2 are 180 degrees phase-shifted relative to each other.

Due to the constant current source 203 and the signal paths 204 and 205, the oscillator 206 is configured to draw substantially equal levels of current across consecutive oscillator signal half-cycles.

In an alternative embodiment only one of the paths 204, 205 is configured with a chargeable element e.g. a capacitor whereas the other path can be configured with a resistor. Thereby, a capacitor is saved when only a single pulse signal is to be provided to the voltage pump.

FIG. 3 shows a first oscillator with constant current consumption. In this embodiment, the oscillator comprises two current sources 303 and 304 which are configured to draw a constant current from the power supply, which can be provided via terminal Tps.

In this embodiment, the current sources 303, 304 are configured to each draw a constant current. The current sources are each coupled to power a respective inverter 301, 302.

Internally, the inverters are arranged to either draw the current through an internal element, eg a resistor or transistor, or through its output. Whether the inverter is in a state where current is drawn through the internal element or in a state where current is drawn through the output is controlled in dependence of whether the voltage level at its input is above or below a threshold voltage level. This threshold can be set as a fraction of the reference voltage Vref. The output of the inverters 301 and 302 is coupled to respective capacitors C2 and C3. When the inverter 301, 302 is in a state where current is drawn through the output, the capacitor is charged and the voltage across the capacitor C2 and C3, respectively, will increase. Alternatively, in the other state of the inverter, the capacitor will be discharged through the inverter or through another load.

A control circuit 305 is configured to provide input signals to the inverters 301 and 302. These input signals are provided as digital signals in response to the voltage levels at the output of the inverters, across the capacitors or as provided at terminals P1 and P2. The control signals are provided such that the capacitors C2 and C3 are alternately charged and discharged to provide oscillating signals P1 and P2 which are phase-shifted approximately 180 degrees relative to each other.

Thus, at terminals P1 and P2 oscillating signals are provided which are functions of the charge on the capacitor C3 and C2, respectively. To obtain digital signals threshold elements e.g. Schmitt-triggers can be provided.

FIG. 4 shows a second oscillator with constant current consumption. This embodiment is an oscillator shown in greater detail. As it appears from FIG. 3 the oscillator is built around two inverters 403 and 404. The inverters 403 and 404 are powered by a current source T1 that is biased by a bias circuit 402, Bias2 to make T1 provide a constant current.

The inverters are configured to either draw current through an internal element, e.g. a resistor or transistor, or through its output. Whether the inverter is in a state where current is drawn through the internal element or in a state where current is drawn through the output is controlled in dependence of whether the voltage level at its input, provided at circuit points ID1 and ID2, is above or below a threshold voltage level.

The output of the inverters 403 and 404 is coupled to respective capacitors C1 and C2. When the inverter 403, 404 is in a state where current is drawn through the output, the respective capacitor is charged and the voltage across the capacitor will increase. Alternatively, in the other state of the inverter, the capacitor will be discharged through the inverter or through another load.

The voltage across the capacitors C1 and C2, dependent on their charge level, controls respective transistors T3 and T5. This is achieved by a circuit node connecting the gate terminals of transistor T3, capacitor C1 and output terminal of the inverter 403. Correspondingly, a circuit node connecting the gate terminals of transistor T5, capacitor C2 and output terminal of the inverter 404.

Transistors T2 and T3 are coupled as constant current sources in series with transistors T3 and T5, respectively. The transistors T2 and T4 are biased by a bias circuit 401, Bias1. T3 and T5 are controlled by the voltage level across the capacitors C1 and C2 which in turn are charged or discharged as determined by voltage levels at their input ID1 and ID2. Thereby buffered oscillator signals P1 and P2 are provided.

The control circuit 405 is provided to control the circuit to provide out-of-phase oscillator signals P1 and P2. Preferably, 180 phase shifted signals are provided.

Figure 5:
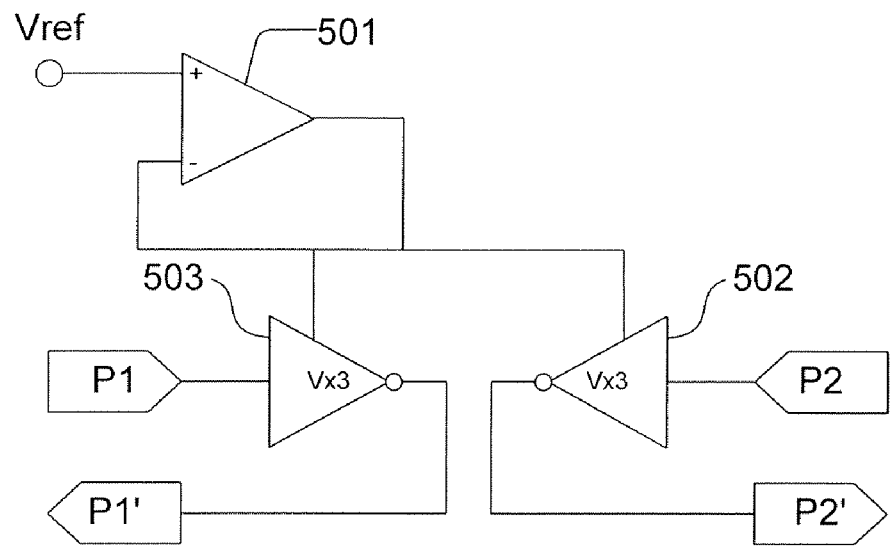
FIG. 5 shows a first embodiment of a first stage voltage pump.

FIG. 5 shows a first embodiment of a first stage voltage pump. The first stage voltage pump comprises a buffer amplifier 501 which provides a voltage reference supply to voltage pumps 502 and 503. This reference supply is regulated to be maintained at a fixed level determined by the reference voltage Vref input to the non-inverting input of the buffer amplifier 501. The output from the buffer amplifier 501 is provided as a feedback to the inverting input of buffer amplifier 501.

The voltage pumps 502 and 503 are preferably implemented by a stacked capacitor principle. The voltage pumps 502 and 503 are connected to receive oscillator signals from e.g. the oscillators shown in FIGS. 3 and 4 in which the respective oscillator signals are designated P1 and P2. At their output, the voltage pumps provide signals P1' and P2'. The voltage pumps can provide an increased voltage level of a factor 2 to 3 e.g. 2.4 or higher, e.g. a factor of 4 to 10.

Normally any IC technology has a nominal operating voltage where all components are specified to be operational. For most CMOS technologies 3V or 5V are common. Below these nominal voltages all devices can be operated safely without breakdown. Complex circuitry can be implemented having high performance.

Above this nominal voltage level a limited number of components are normally available. That is, standard CMOS transistors can not be used as they would brake down. However, there exist IC technologies with so-called High Voltage CMOS transistors, but these technologies are expensive and High Voltage CMOS transistors are very bulky. Therefore, it is advantageous to divide the voltage pump into two sections: a low voltage part and a high voltage section. The low voltage section operating below the normal operating voltage of the technology, normally 3V or 5V and the high voltage section operating above. At the high voltage section the IC components are configured precautionary to avoid breakdown of the components at the High Voltage levels.

The signals P1' and P2' are thus pumped oscillator signals. These signals are provided with regulated amplitude levels by means of the feedback configuration. Thereby precise oscillator signals are provided. Since the feedback configuration requires a more complex circuit layout, all other things being equal, this first stage voltage pump is preferably implemented on a portion of the chip die which is configured for operation at or below a nominal voltage level for that portion of the chip die and the amplitude levels of P1' and P2' is preferably substantially equal to the nominal voltage level for the portion. A following voltage pump operating at the oscillator signals P1' and P2' can be made simpler since precise amplitude levels are input to the following pump. Additionally, since the amplitude of oscillator signals are typically well below the nominal voltage level pumping of the amplitude to the nominal value reduces the number of following voltage pump stages to reach a given (pumped) bias voltage level.

Figure 6:
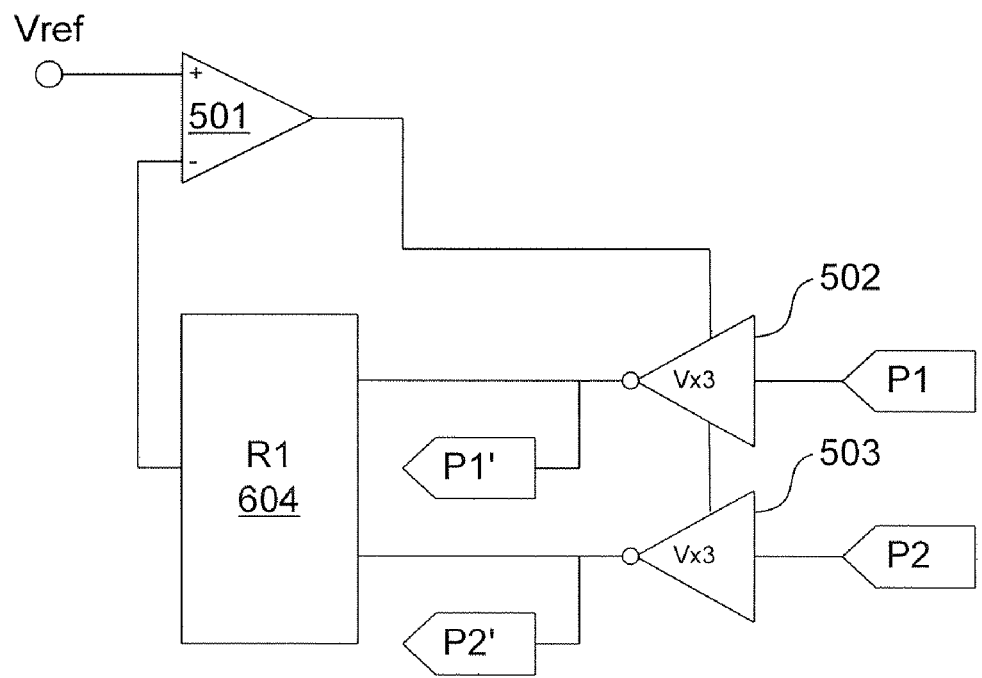
FIG. 6 shows a second embodiment of a first stage voltage pump.

FIG. 6 shows a second embodiment of a first stage voltage pump. In this embodiment the output signals P1' and P2' are provided as feedback signals to the buffer amplifier 501 at its inverting input. The output signals P1' and P2' are provided as feedback via circuit 604 to obtain an accurate and/or fixed pulse level of the signals P1' and P2'. The circuit 604 provides an output signal representing the amplitude of P1' and P2' in combination e.g. by integration over P1' and P2'.

In a preferred embodiment an additional feedback loop can be provided to obtain a desired stability of the circuit/regulator providing the accurate and/or fixed pulse level.

Figure 7:
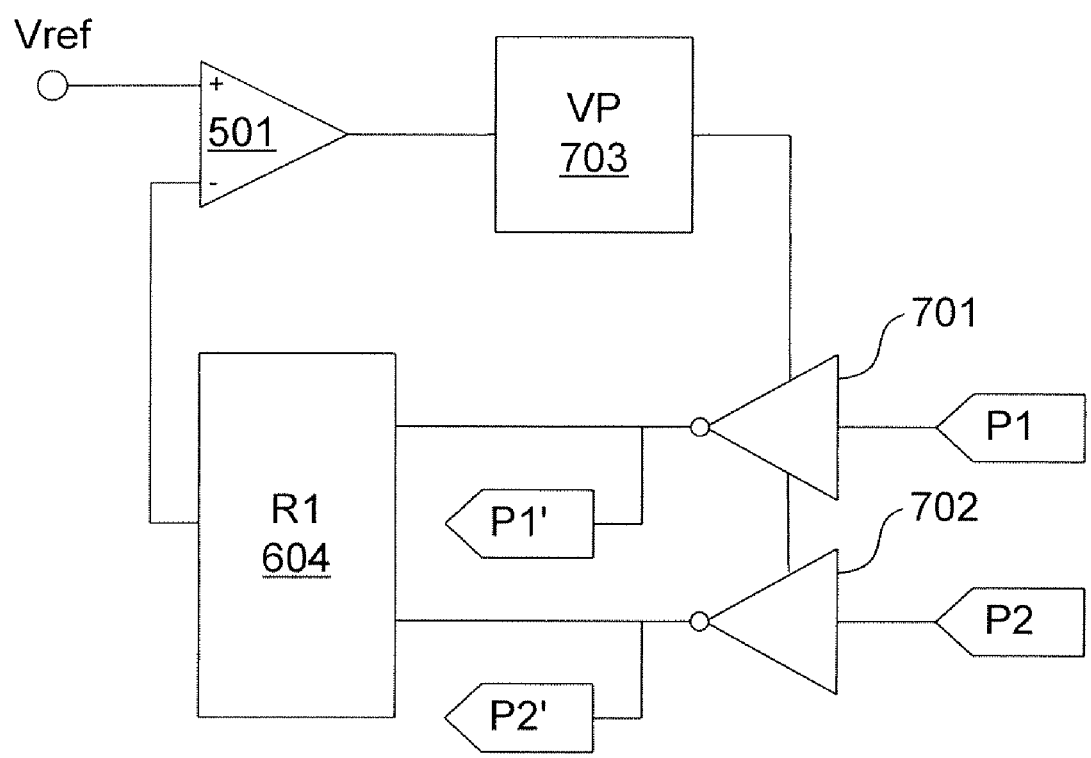
FIG. 7 shows a third embodiment of a first stage voltage pump.

FIG. 7 shows a third embodiment of a first stage voltage pump. In this embodiment the inverters 502 and 503 which pump an input voltage e.g. 2.4 or 3 times are replaced by an ordinary inverter which does not pump input voltage. However, in order to obtain the precise and relatively high pulse amplitude level at the low voltage section, a voltage pump 703 is provided. This voltage pump 703 provides a pumped supply voltage to the inverters 701 and 701. The inverters are configured to provide the oscillator signals P1' and P2' with pulse amplitude voltages substantially equal to the supply voltage of the inverters. Thereby an alternative circuit for providing regulated oscillator signals is provided.

In still an alternative circuit for providing regulated oscillator signals the feedback signal to the inverting input (−) of the buffer amplifier 501 is provided directly from the output of the voltage pump VP, 703. Thereby, the output voltage provided by the inverters 701 and 702 are not included in the feedback loop. But since the inverters are relatively precise compared to the voltage pump 703 good regulation of P1' and P2' is achieved. Thereby the circuit 604 can be avoided.

Figure 8:
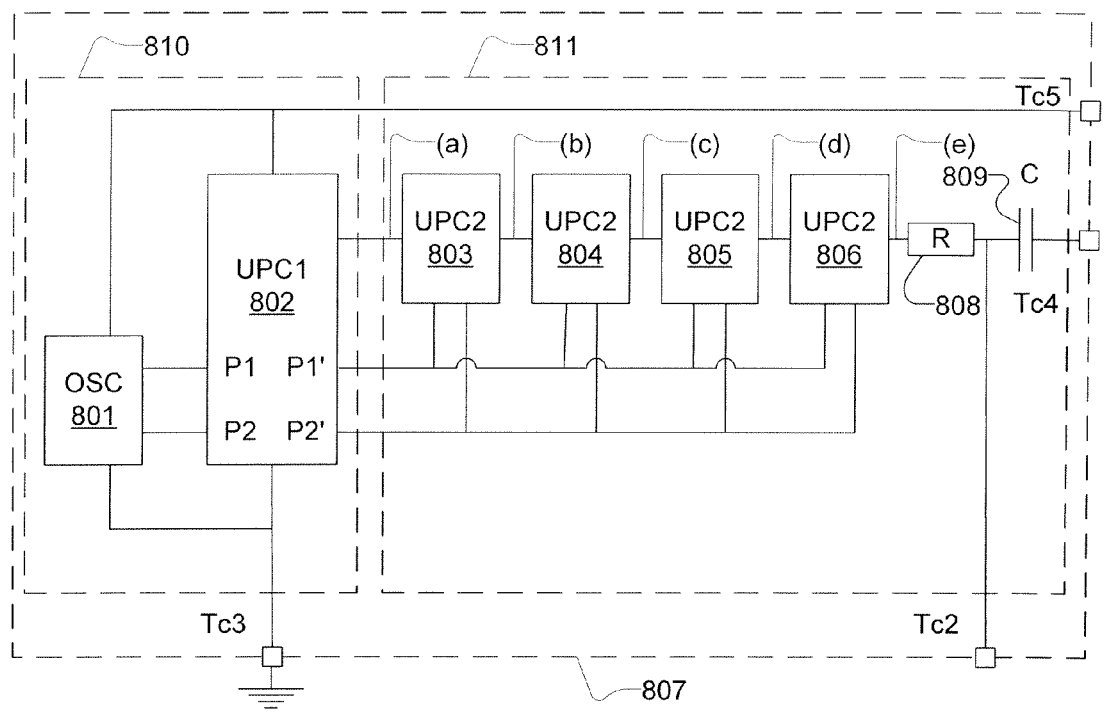
FIG. 8 shows a compound voltage pump.

FIG. 8 shows a compound voltage pump. The compound voltage pump 707 comprises a first stage voltage pump 802, UPC1 and a second stage voltage pump. The second stage voltage pump comprises a cascade of voltage pumps 803, 804, 805, 806, UPC2.

The first stage voltage pump can be implemented in various ways, but preferred embodiments of the first stage voltage pump have been disclosed in the above. The first stage voltage pump is based on an oscillator 801 which provides oscillator signals P1 and P2 phase shifted about 180 degrees relative to each other. The oscillator signals are provided to the voltage pump 802, UPC1 to provide pumped oscillator signals P1' and P2'. It is recalled from the above that the pumped oscillator signals are regulated to provide precise and at the same time relatively high voltage levels. It is further recalled that the pumped oscillator signals are provided by the circuits implemented in a low voltage section. This low voltage section is illustrated by the dashed box 810.

If the pulse amplitudes of the repeated pulses constituting the oscillator signals P1' and P2' are maximized with respect to the nominal voltage level specified for the low voltage section 810, the number of cascaded voltage pumps at the second stage can be minimized, other things being equal. Consequently, a more chip area efficient design is provided.

It is recalled that any IC technology has a nominal voltage at or below which all components are specified to be operational without DC voltage breakdown. At or below the nominal voltage complex circuitry can be implemented with high performance. Above this nominal voltage level only a limited number of components are available. That is, e.g. standard CMOS transistors cannot be used as they would brake down due to the high voltage levels. The limited number of components comprise High Voltage CMOS transistors, but the technology for implementing the High Voltage CMOS transistors is expensive and the components are very bulky. Therefore it is advantageous to divide the charge pump into a low voltage section and a high voltage section.

Reverting to the description of the voltage pump: The pumped oscillator signals P1' and P2' are provided to each of the voltage pumps 803, 804, 805, 806, UPC2 arranged in cascade. Each of the voltage pumps designated UPC2 is provided with an input signal which at circuit nodes (b), (c) and (d) is characterized as a DC voltage superposed by an oscillating signal with a pulse amplitude largely about the pulse amplitude of P1' or P2'. The node (a) is preferably coupled to receive a DC signal from UPC1. This DC signal can be a ground reference, a DC level e.g. the DC supply voltage provided to the inverters 502, 503 or another DC signal.

The cascade of voltage pumps generates gradually larger voltage levels from circuit node (a) to circuit node (b), to circuit node (c), to (d) and to (e). Each of the voltage pumps can add a voltage corresponding to e.g. four times the pulse amplitude of the oscillator signals to the DC signal input to the voltage pump. However, this depends on the configuration of the pump and especially on the number of capacitors in the configuration and the magnitude of loss in the pump.

The voltage level provided by voltage pump 805 at circuit node (e) is provided via a series resistor 808, R and terminal Tc2 as a microphone bias voltage to provide an electrical charge on one of the microphone members.

The capacitor 809, C is coupled to block the pumped DC bias voltage from reaching the input stage of a preamplifier (not shown) coupled to terminal Tc4 to receive a microphone signal from the microphone member coupled to terminal Tc2 at which the bias voltage is provided.

The oscillator 801 and the voltage pump 802 is provided with operating power by drawing a current via terminal Tc5. However, the operating power could be provided via terminal Tc4 also providing the microphone signal.

Especially for telecom microphones it is expedient to apply this multistage voltage pump to obtain a relative large overall voltage pump factor per chip die area unit.

Preferably, the voltage pumps 803, 804, 805 and 806, UPC2 are of the same type; preferably they are similar or identical.

High voltage IC components require larger mutual spacing, deeper wells, thicker gate oxide etc. That is, physically they are different components. In the following a voltage pump of the Dickson type for implementation in the high voltage section is described.

Figure 9:
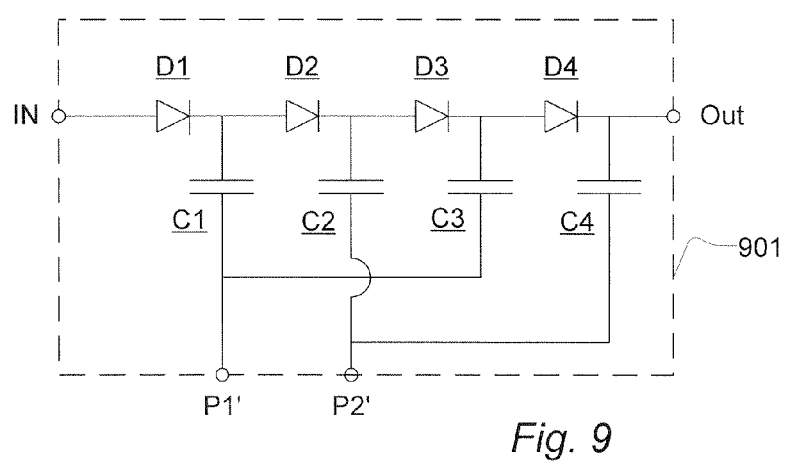
FIG. 9 shows a second stage voltage pump.

FIG. 9 shows a second stage voltage pump. This voltage pump is shown in the form of a Dickson-converter and constitutes preferably the modules 803-806, UPC2 of the compound voltage pump. In this embodiment the Dickson-converter comprises four diode-capacitor stages, but fewer or more stages can be applied. The Dickson voltage pump usually consists of several diode-capacitor stages. The numbers of sections depend on pulse amplitude of oscillator signals P1' and P2' and the desired output voltage. The voltage pump 901 receives an input voltage signal. In case the pump 901 is coupled in a cascade the input signal can be provided by a preceding pump module as a DC signal superposed by an oscillating signal largely corresponding to P1' or P2'. The input signal is provided at the terminal designated 'In' and provides a pumped output signal at its terminal designated 'Out'. The pump is operated by the oscillator signals P1' and P2' to alternately charge the capacitors C1, C3 and C2, C4, respectively. When the voltage pump has reached a normal operating state and the pumped output voltage thus has reached a nominal level, each diode-capacitor stage adds a voltage step equal to the oscillator pulse amplitude minus any loss at the stage. Consequently, an output voltage greater than the input voltage and the pulse amplitudes can be provided.

The Dickson charge pump is characterized by a simple circuit configuration which can be implemented in many different IC technologies. The Dickson pump can be implemented using a very small chip area. Additionally, the Dickson charge pump is characterized by low noise and low output ripple when driving high impedent loads (a microphone). That is, when the voltage pump has reached a normal operating state and the pumped output voltage thus has reached a nominal level, the current through the diodes D1, D2, D3 and D4 (or active devices in the form of CMOS transistors etc.) becomes very small. This in turn increases the impedance of the diodes dramatically and thus effectively filters any switching noise and noise from other circuit parts.

However, in the attractive and simple IC implementation its pump level performance is degraded by parasitic capacitors and its pump level factor relating the input voltage level to the output voltage level is poorly controllable. Thereby, predictable or desired bias levels are difficult to achieve. Since the multiplication factor depends on parasitic capacitors and because there is an absolute voltage drop across each Dickson section as few Dickson stages as possible should be used to obtain an efficient circuit configuration.

The precision of the Dickson multiplier can be increased and the voltage drop across each Dickson section can be minimized. But this is at the expense of increased complexity and size. That is, the Dickson multiplier can then not be implemented using simple components but must be implemented using high voltage transistors and a special high voltage processes. This causes larger area and higher cost.

Standard IC technologies, which are preferred, provide possibilities of making components which can withstand higher voltages than the nominal voltages. These components are based on parasitic capacitors and are thus not very precise and are poorly controlled. Note that metal capacitors are based on parasitic coupling between metal layers, junction diodes in n-wells etc. But the use of such components is possible only if a simple voltage pump, like the Dickson pump, is utilized. Use of the simple Dickson multiplier also enables us to use a subset of High Voltage components from High Voltage technologies e.g. deep N-Wells.

When the pulse amplitude of the oscillator signals P1' and P2' is substantially equal to the nominal voltage of the low voltage section, the high voltage part can be configured with simple voltage pumps. This provides the advantage of implementing the pump using parasitic components which can withstand the high voltage. Examples of parasitic components are metal capacitors, junction diodes and poly diodes.

Figure 10:
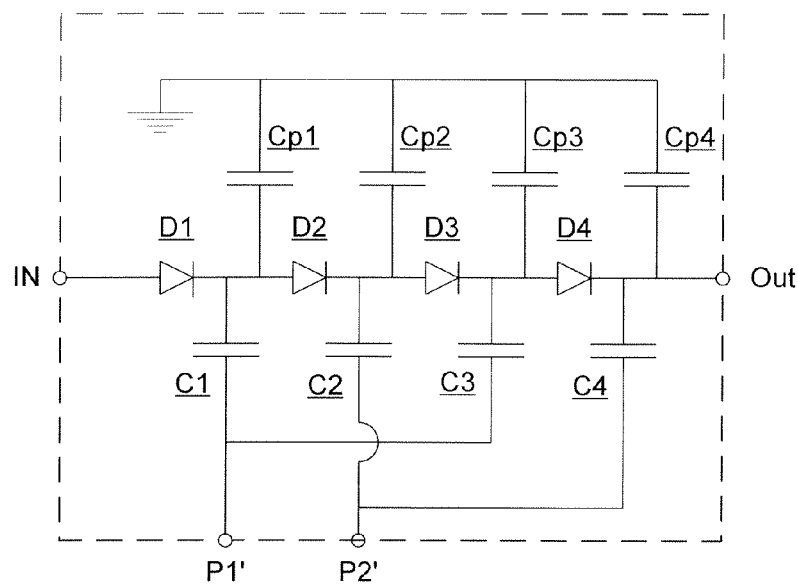
FIG. 10 shows a second stage voltage pump with parasitic capacitors.

FIG. 10 shows a second stage voltage pump with parasitic capacitors. This stage corresponds to the pump stage shown in FIG. 8, but here parasitic capacities Cp1, Cp2, Cp3 and Cp4 are shown. The parasitic capacities come into existence when capacitors C1, C2, C3 and C4 are implemented on an integrated circuit chip.

Figure 11:
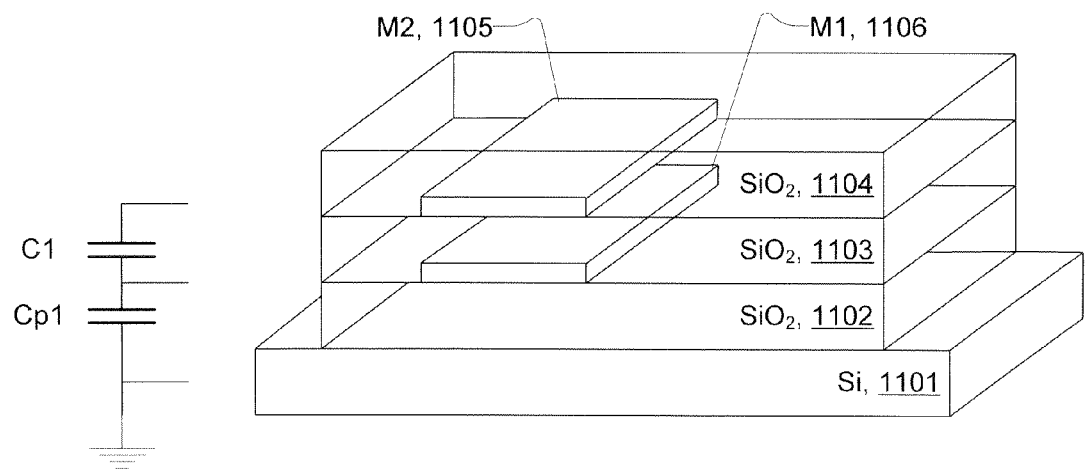
FIG. 11 shows an IC implementation of a metal oxide capacitor.

FIG. 11 shows an IC implementation of a metal oxide capacitor. Generally, and when implementing capacitors of the voltage pump, Metal Oxide Substrate (MOS) IC technology provides only limited capacity per area unit. However, MOS technology is capable of withstanding high voltages without voltage breakthrough (disruptive discharge). Therefore the MOS technology is suitable for implementing high-voltage voltage pumps or cascaded stages of Dickson converters. It should be noted that the second stage of the compound voltage pump typically gives rise to voltages above 10 volts, e.g. 15, 20, 30 or even up to 50 or 60 volts. These voltages are high voltages for technologies commonly available for consumer product microphones such as mobile phones, cameras, PDA's etc.

The IC implementation of the metal oxide capacitor is sketched for a capacitor e.g. C1 of FIG. 10. The capacitor is implemented by means of two metal plates. The capacitor is implemented on a silicium substrate 1101. On the silicium substrate a first layer of silicium oxide 1102 is provided to isolate a first plate M1, 1106 electrically from the substrate. A second layer of silicium oxide 1103 is provided on the first layer and the plate M1, 1106 to isolate the first plate from a second plate M2, 1105. A third layer of silicium oxide 1104 is provided to isolate the plate M2 from other circuitry or surroundings. Paths to connect the capacitor plates are routed e.g. in the second and third oxide layers 1103 and 1104.

Since typically, the substrate is connected to a ground reference it appears that the substrate forms a capacitor plate which acts with the first plate of C1 to create the parasitic capacitor Cp1.

Compared to so-called poly-capacitors, the oxide layer is thicker in MOS technology therefore the capacity is lower.

Figure 12:
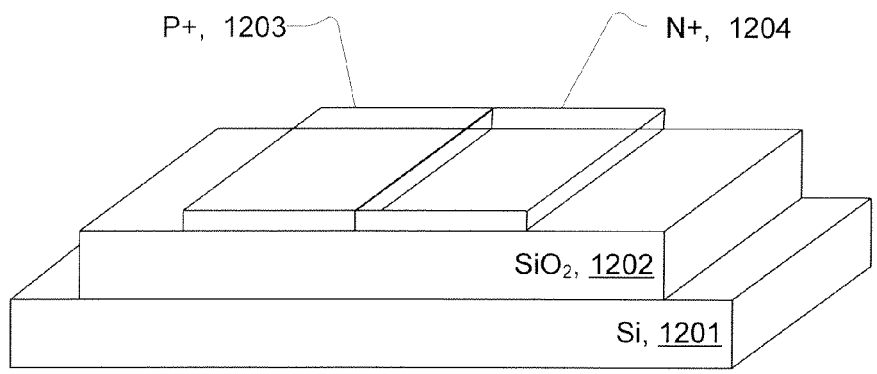
FIG. 12 shows an IC implementation of a poly-diode.

FIG. 12 shows an IC implementation of a poly-diode. IC implementation of the poly-diode is sketched for a single diode. The diode is implemented by means of layer sections of a P+ doted material 1203 and a N+ doted material 1204 arranged adjacent to the P+ section. The P+ doted and N+ doted layer sections are arranged on a layer of silicium oxide to isolate the sections from the silicium substrate 1201.

Poly-diodes are expedient for voltage pumps since they can withstand high voltages. Typically, the oxide layer has a thickness of about 1000 nm and can withstand up to 200-300 volts.

Figure 13:
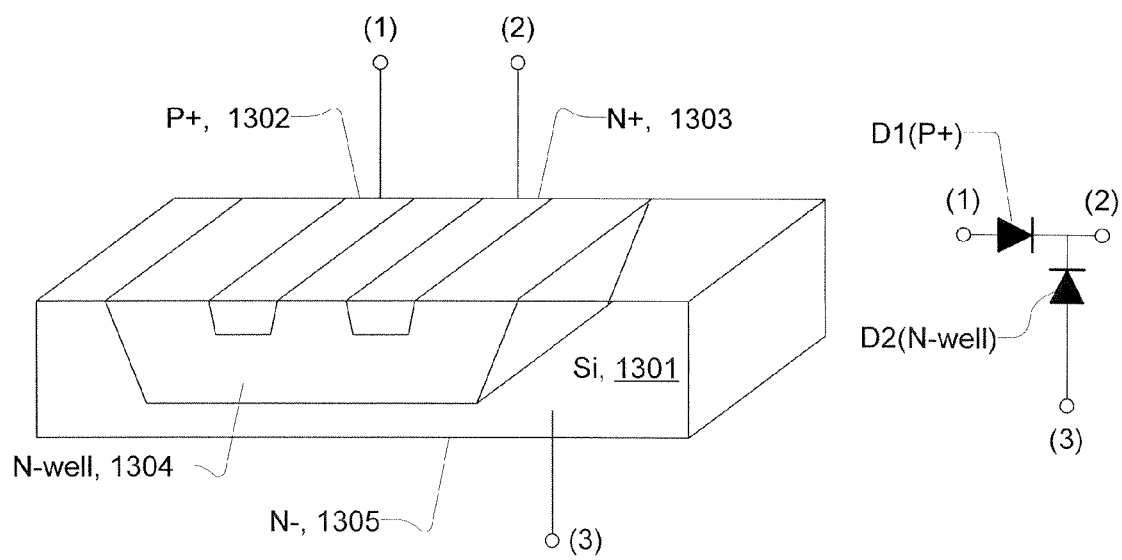
FIG. 13 shows an IC implementation of a diffusion diode in an N-well.

FIG. 13 shows an IC implementation of a diffusion diode in an N-well. The diffusion diode is placed in a well in a silicium substrate layer 1301. The well 1304 is obtained by providing a N+ doted a portion of the substrate 1301. In the well 1304 a P+ doted portion 1302 is provided spaced apart from an N+ doted portion 1303.

The P+ doted portion is provided with a circuit path to provide an electrical circuit node (1) and the N+ doted portion is provided with a circuit path to provide a circuit node (2). Thereby a diode D1 is formed. However, due to the physical structure of the N-well diode and since the substrate 1301 typically is connected to a ground reference (node (3)), a parasitic diode D2 is also created.

Figure 14:
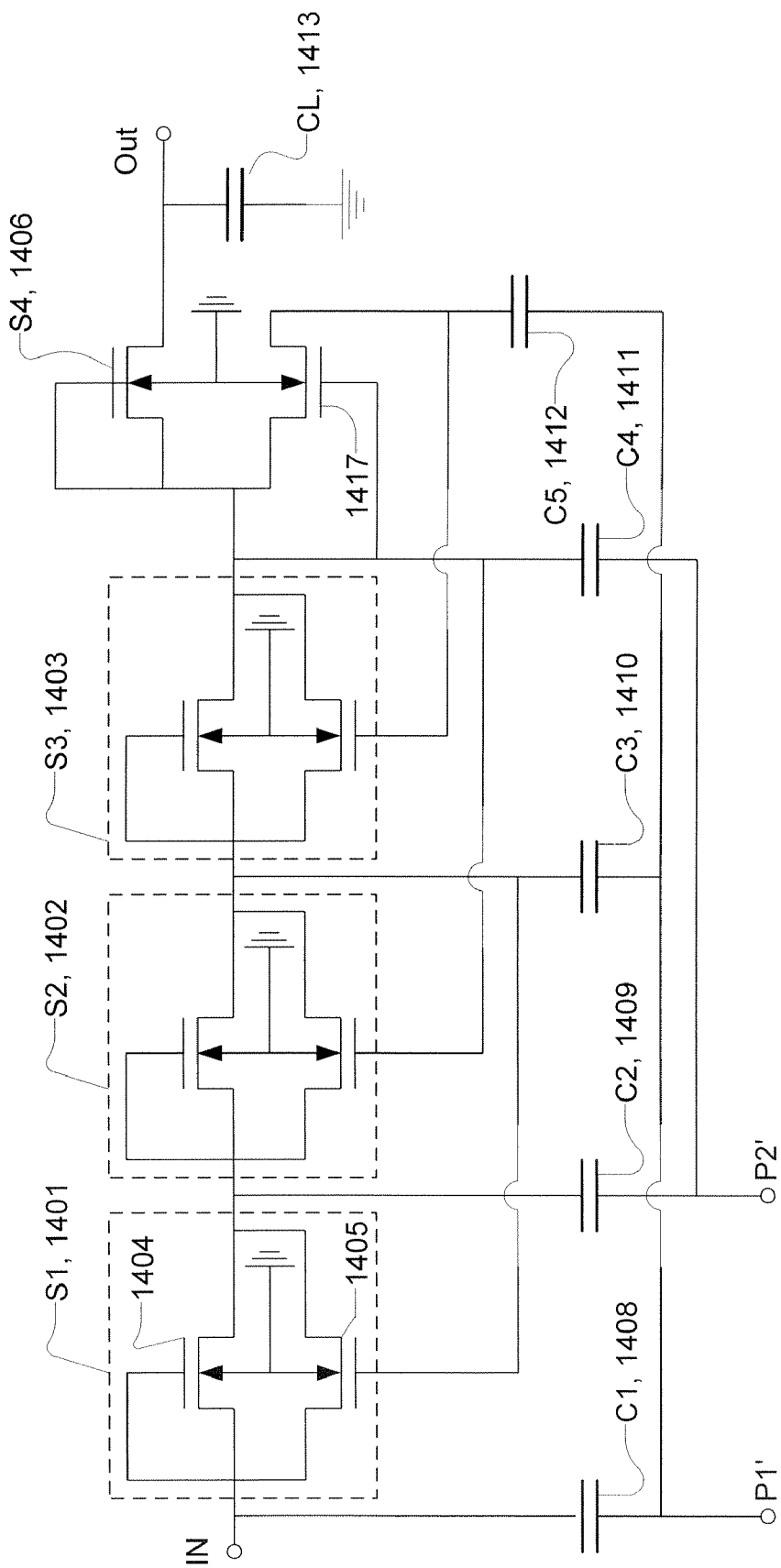
FIG. 14 shows a charge pump with N-MOS switches.

FIG. 14 shows a charge pump with N-MOS switches. The charge pump is of the Dickson type and comprises four switch-capacitor stages: S1, C1; S2, C2; S3, C3; and S4, C4. The N-MOS switches 1401, 1402, 1403 comprises a first N-MOS transistor 1401 coupled as a diode to provide bias of a second transistor 1405 coupled as a controllable switch.

The switch S4 of the last switch-capacitor stage is coupled as diode. The capacitor 1413, CL represents a load (the microphone element). The transistor 1407 provides in combination with the capacitor 1412, C5 control of the switch S3, 1403.

It should be noted that other types and implementations of a voltage pump are available.

Figure 15:
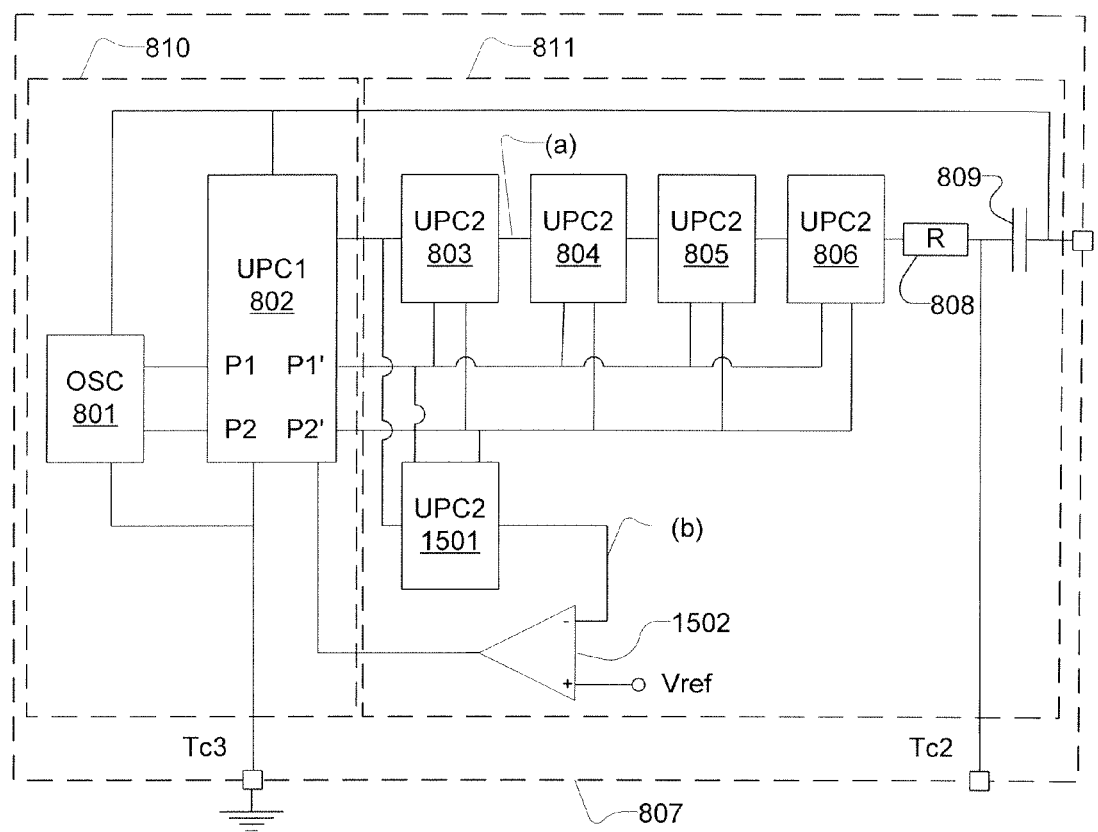
FIG. 15 shows a compound charge pump with a master-slave configuration.

FIG. 15 shows a compound charge pump with a master-slave configuration. In this configuration of the compound charge pump 807 a simple feedback circuit is provided in the high voltage section 811. The feedback circuit is based on a voltage pump module 1501 which is similar, preferably as similar as possible, to the voltage pump module 803. The voltage pump module 1501 receives the same inputs as the pump module 803. The output of the pump module 1501 is coupled to a regulator 1502 (shown in the form of a comparator). The output from the pump module 1501 is compared to a reference voltage Vref and the regulator provides an error signal back to the voltage pump 802. The voltage pump 802 is configured to provide regulated amplitudes of the oscillator signals P1' and P2' in dependence of the error signal. Thereby a master slave regulating configuration is provided, where a voltage is sensed at the high voltage section, but at a relatively early stage of the cascaded voltage pumps at the high voltage section.

In an alternative configuration the sensed voltage at circuit node (b) is provided directly from circuit node (a). Thereby, the master voltage pump 1501 can be saved.

Figure 16:
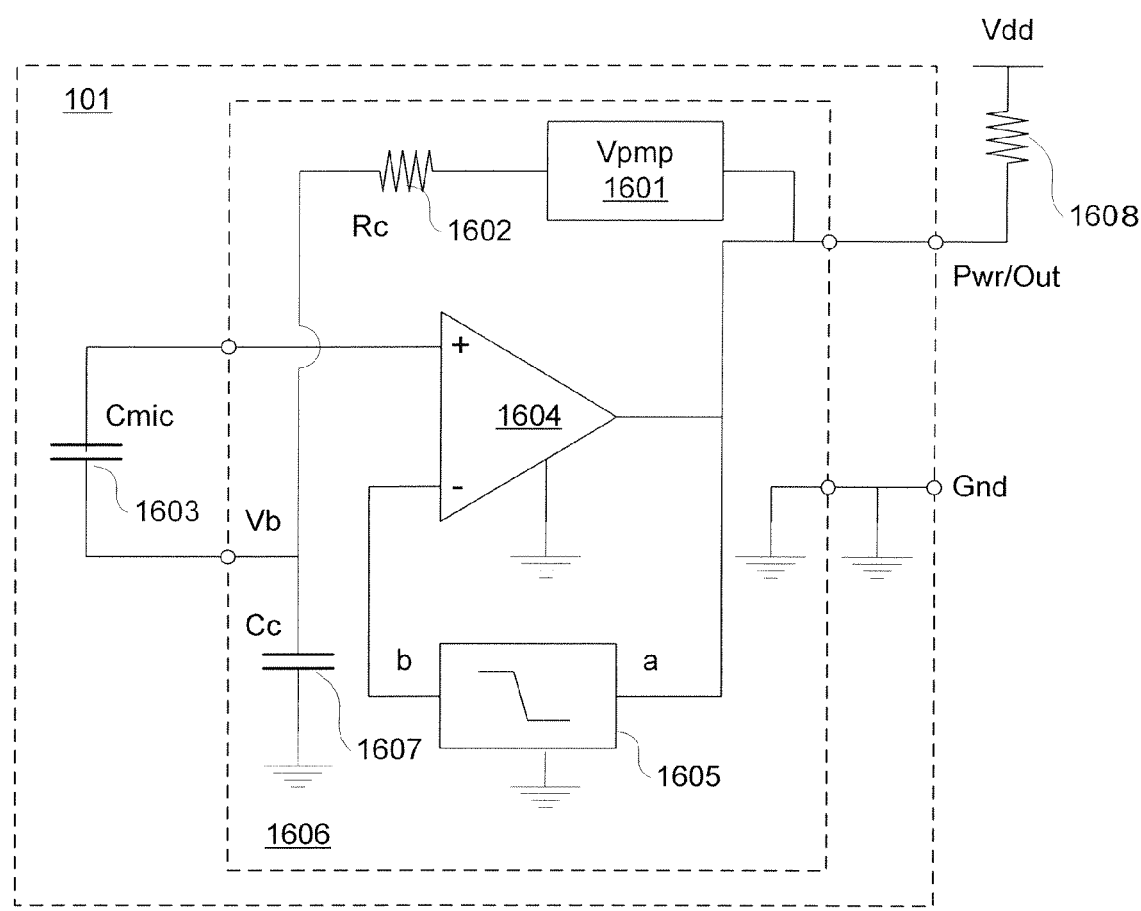
FIG. 16 shows a microphone with an integrated circuit with a voltage pump and a preamplifier with a feedback filter.

FIG. 16 shows a microphone with an integrated circuit with a voltage pump and a preamplifier with a feedback filter. The voltage pump Vpmp, 1601 provides a pumped voltage as a bias voltage Vb via the resistor Rc, 1602. A capacitor Cc operates with the resistor Rc to decouple noise from the voltage pump. The voltage pump 1601 can be embodied as shown in FIG. 8, in which case the resistor Rc, 1602 corresponds to resistor R, 808 and the capacitor Cc corresponds to the capacitor C, 809. However, in the shown configuration the microphone element Cmic, 1603 is coupled as a floating device. This configuration, of coupling the microphone element as a floating device, is especially expedient when the microphone element is a MEMS device since MEMS microphones typically allow for being coupled as a floating device. The voltage pump receives an operating current via the output terminal, designated Pwr/Out, of the microphone 101.

In an alternative configuration the microphone element 1603 is coupled with one of its microphone members to the ground reference cf. e.g. FIG. 1. For a typical electrostatic condenser microphone one of its microphone members (typically the back plate) is configured to be connected to the ground reference.

A non-inverting input (+) of the operational amplifier 1604 is coupled to receive a microphone signal from a first of the plate members of the capacitor microphone element Cmic. The amplifier 1604 is provided with a feedback circuit 1605. The feedback circuit 1605 has an input port designated 'a' coupled to receive an output signal from the amplifier 1604 and an output port designated 'b' coupled to an inverting input (−) of the amplifier 1604. The preamplifier comprising the amplifier 1604 and feedback circuit 1605 is implemented on a semiconductor substrate 1606.

The amplifier 1604 and the feedback circuit 1605 have, in combination, a frequency transfer function from the non-inverting input (+) to the output (which corresponds to the circuit node connected to the input port 'a' of the feedback circuit). This frequency transfer function has a high-pass characteristic. However, the feedback circuit has a frequency transfer function from the port 'a' to the port 'b' with a zero and a pole; wherein the zero is located at a higher frequency than the pole. Thus the feedback circuit has a low-pass characteristic.

The feedback circuit in the form of a filter can be a first order filter or it can be of higher order; e.g. second order, third order or fourth order. Also it can be implemented as a passive circuit or as an active circuit. The feedback loop assures that the overall gain of the amplifier with feedback is relatively low at low frequencies (below e.g. 20, 10 or 5 Hz) and relatively high at audio band frequencies (in the range e.g. 20 Hz to 20 KHz).

The preamplifier is powered from its output terminal designated Pwr/Out. However, it should be possible to draw a current through the terminal Pwr/Out e.g. via a resistor 1608 coupled to a supply voltage Vdd. The amplifier is coupled as a non-inverting amplifier with the microphone connected to the non-inverting input. This ensures that the capacitive loading of the microphone is very low. Due to the feedback, the inverting input terminal (−) of the amplifier 1604 will exactly follow the non-inverting terminal (+). If the input stage of the amplifier 1604 is a differential transistor pair (i.e. a differential stage), gate-source voltages of the transistor pair will remain constant and the input capacitance will consequently be very low.

Reverting to bias voltage generated by the voltage pump: It is recalled that when there is no electret layer on one of the microphone plate members, an external bias is needed and can be supplied by a voltage pump integrated on the same semiconductor substrate as the preamplifier. Further, voltage pumps are normally quite noisy and thus a decoupling filter is needed. This filter can consist of a decoupling capacitor Cc and a large resistor, Rc. To decouple the noise of the voltage pump 1101, a filter with a very low cut-off frequency is needed. And thus it settles very slowly during power up. That is, a very large low frequent signal will be present on the input of the amplifier for a substantial period of time. So, the preamplifier with a low gain at low frequencies proves to be very beneficial.

If the microphone is biased at a high DC voltage, a DC coupling capacitance is needed between the amplifier and the microphone as the amplifier is in nearly all cases unable to handle the large DC level without overload. Furthermore by integrating everything on the same chip the total performance can be optimized yielding the best possible performance.

It should be noted that operating power to the integrated circuit can alternatively be provided via a separate power terminal, thereby providing the microphone signal and receiving operating power via different terminals.

Figure 17A:
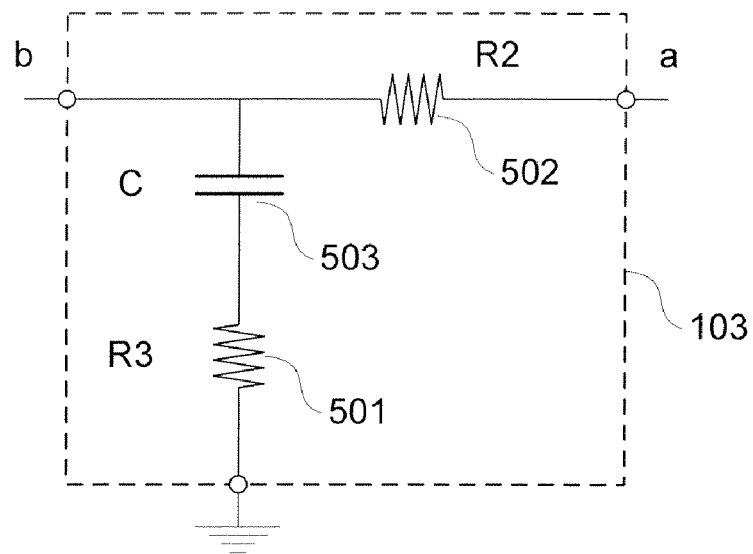
FIG. 17a shows a first feedback filter.

FIG. 17a shows a first feedback filter. The feedback filter 1605 forms a feedback circuit with an input port designated 'a' and an output port designated 'b'. The input port, a, is connected to a ground reference via a series connection of a first resistor R2, 1702; a capacitor C, 1703; and a second resistor R3, 1701. The output port, b, is coupled to the circuit node formed by the interconnection of the first resistor R, 1702 and the capacitor C, 1703.

The feedback filter can be implemented in many ways, but not all of them are equally easy to integrate on a chip. Especially filter types with series resistors are difficult to implement as the component values needed are implemented with difficultly on a chip or semiconductor substrate.

The desired filter transfer function is a high-pass filter function. This is typically implemented using two resistors in series with a capacitor (see FIG. 17a). At lower frequencies the transfer function from port a to port b is close to one and at higher frequencies it is determined by the ratio of R2 and R3. In order to obtain low noise the resistors will have to be in the kOhm range and thus require the capacitor value to be nF range to realize a desired cut-off frequency. Capacitors in the nF range would require excessive chip area, and such solutions are thus deemed to be not possible for a chip implementation. However, it should be within the skills of a person skilled in the art to modify the filter for expedient IC implementation.

Figure 17B:
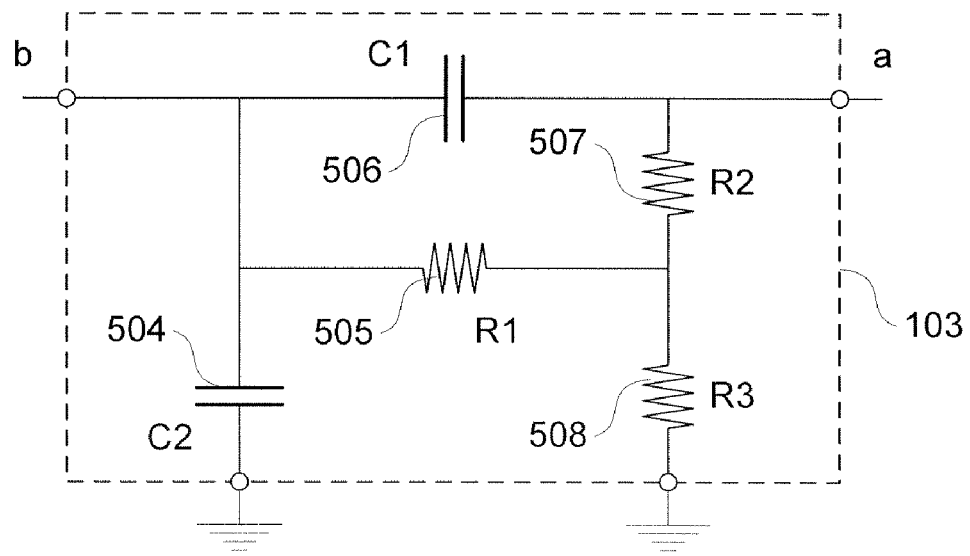
FIG. 17b shows a second feedback filter.

FIG. 17b shows a second feed-back filter for IC implementation. The feedback filter 1605 forms a feedback circuit with an input port designated 'a' and an output port designated 'b'. The filter has a configuration with an input port, a, connected to a series connection of a first resistor R2, 1707 and a second resistor R3, 1708 which forms a resistor node at their interconnection. The input port is also connected to a series connection of a first capacitor C1, 1706 and second capacitor C2, 1704 which forms a capacitor node at their interconnection. The capacitor node forms the output port. Additionally, the resistor node and capacitor node are interconnected by a resistor R1, 1705.

For this configuration of the feed-back filter, the low frequency transfer function from port a to port b is determined by the two resistors R2, 1707 and R3, 1708. The high frequency transfer function is determined by C1, 1706 and C2, 1704. The cut-off frequency of the filter can be set by R1, 1705. If R1, 1705 is chosen to be very large, the noise of the filter will moved to very low frequencies and the audio band noise can thus be minimized without using excessively large capacitor values. Suitable ranges for implementation on a semiconductor substrate are C1=1-500 pF, C2=1-500 pF and R1=GOhm-Tohm.

Figure 18:
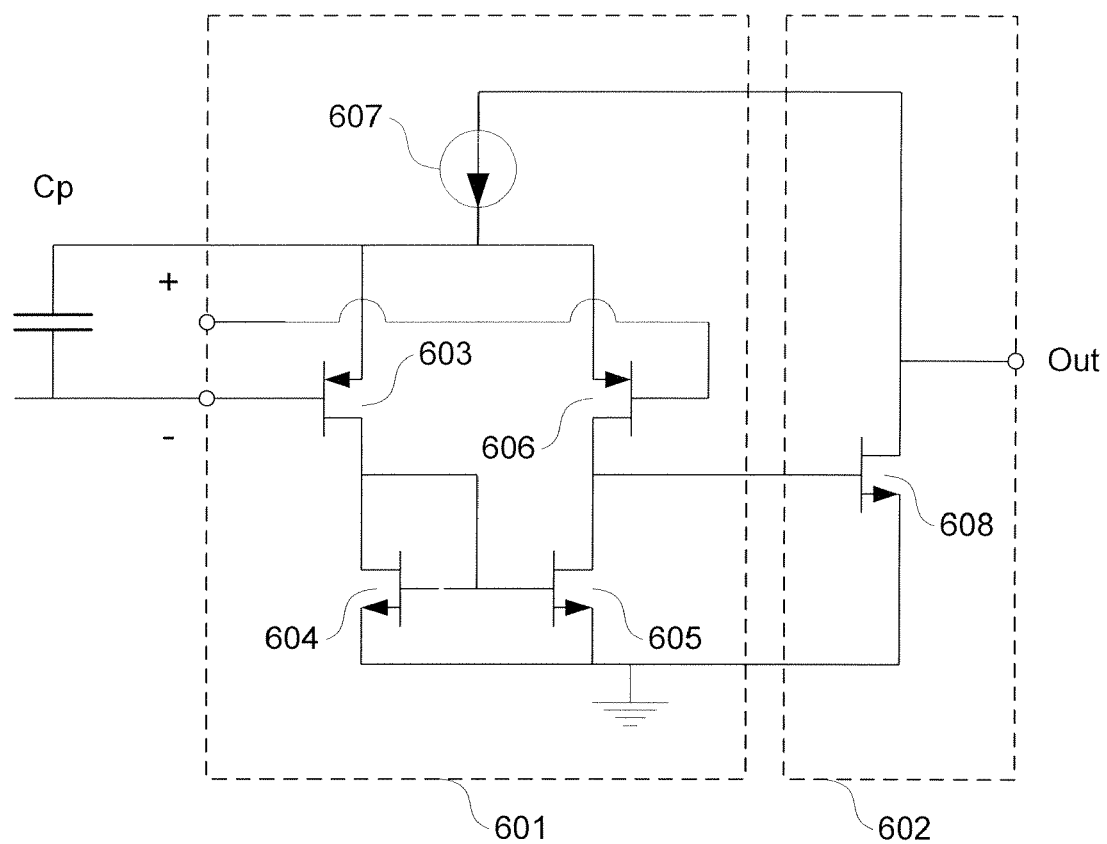
FIG. 18 shows a bootstrap configuration in connection with a detailed view of the preamplifier.

FIG. 18 shows a bootstrap configuration in connection with a detailed view of the preamplifier. The amplifier input stage 1801 comprises a differential pair of PMOS devices 1803, 1806. This differential pair will have to be optimized in both width and length as an optimum for 1/f noise and white noise exists. If needed, an offset can be built into the differential pair by adjustment of the aspect ratio of the two transistors in the differential pair. Alternatively or additionally, the mirroring factor of the current mirror 1804, 1805 in the bottom of the differential stage can be adjusted. If the ratio between the aspect ratio of the differential pair transistors are A and the current mirror factor is B, the offset of the amplifier will be $n*Vt*\ln(A*B)$. Where n is the so-called weak-inversion slope factor and Vt is a constant approximately equal to 26 mV.

Various implementations of a differential input stage exist—for instance, the NMOS current mirror 1804, 1805 can be replaced by a so-called folded cascode in combination with a PMOS current mirror.

At the output stage 1802 of the amplifier, an output transistor 1808 is connected to the high impedent gain node. The function of this is to add gain and to isolate the high impedant node from the outside. Note that the only device which has a varying current is the output transistor. Thereby the other transistors are biased by constant current sources.

Thus, a principle amplifier with a differential input stage and an output stage is described.

As described above Metal Oxide capacitors inherently provide a parasitic capacitor. Thus a DC blocking capacitor like capacitor C1, 107 establishes a parasitic capacitor. This parasitic capacitor will degrade the microphone signal input to the preamplifier. However, as shown by capacitor Cp, 1809 the effect of this parasitic capacitor can be substantially removed by coupling the parasitic capacitor between the input terminal of the amplifier at which the microphone signal is received (e.g. the non-inverting input) and the circuit node of the amplifier established between transistors 1807 and 1803 (1806). Between these two nodes the transistor 1803 (1806 as the case may be) provides a gain of about 1 time (0 dB). Thereby the voltage swing across the capacitor is kept at about 0 volt.

Alternatively, the parasitic capacitor is coupled between the inverting input (−) and the non-inverting input (+) of the preamplifier. Thereby the voltage following property of the input terminals is utilized to reduce the effect of the parasitic capacitor Cp.

A first one of the plate members of the parasitic capacitor Cp is shared with the non-parasitic capacitor (e.g. the a DC blocking capacitor like capacitor C1, 107). The other plate member of the parasitic capacitor Cp is basically the substrate of the IC, but since this is coupled to ground, a shield between the substrate and the first plate member is provided to establish a contact to the parasitic capacitor. The shield is provided by means of e.g. an N-well diode which provides for electrical insulation to the substrate while being a plate member of the parasitic capacitor.

Figure 19:
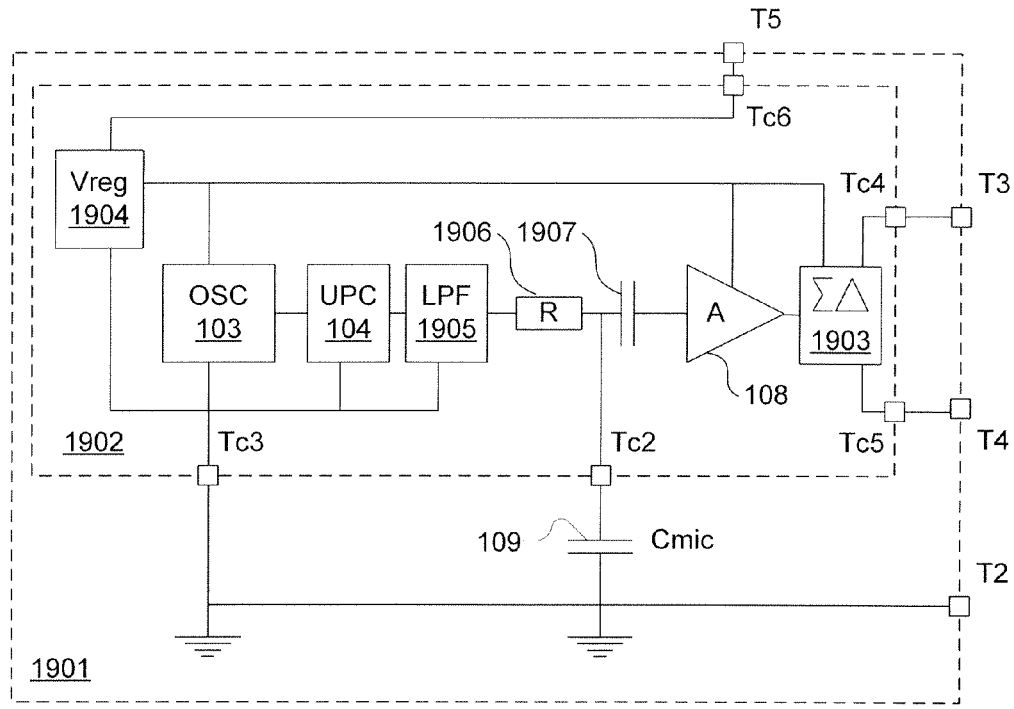
FIG. 19 shows a first embodiment of a microphone comprising an integrated circuit with a sigma-delta A/D converter.

FIG. 19 shows a first embodiment of a microphone comprising an integrated circuit with a sigma-delta A/D converter. The sigma-delta A/D converter 1903 receives a clock-signal via a terminal Tc4 of the chip die 1902 and terminal T3 of the microphone 1901. In response to the clock-signal, serial digital data are outputted via terminals Tc5 and T4. The sigma-delta converter receives a voltage reference from the regulator 1904 which also provides a voltage reference or supply to the oscillator 103 and to the amplifier 108. The regulator 1904 receives operating power via separate terminal Tc6 (T5).

The low pass filter 904, LPF filters the pumped voltage from the voltage pump 104 to diminish primarily switching noise in the pumped voltage signal.

Figure 20:
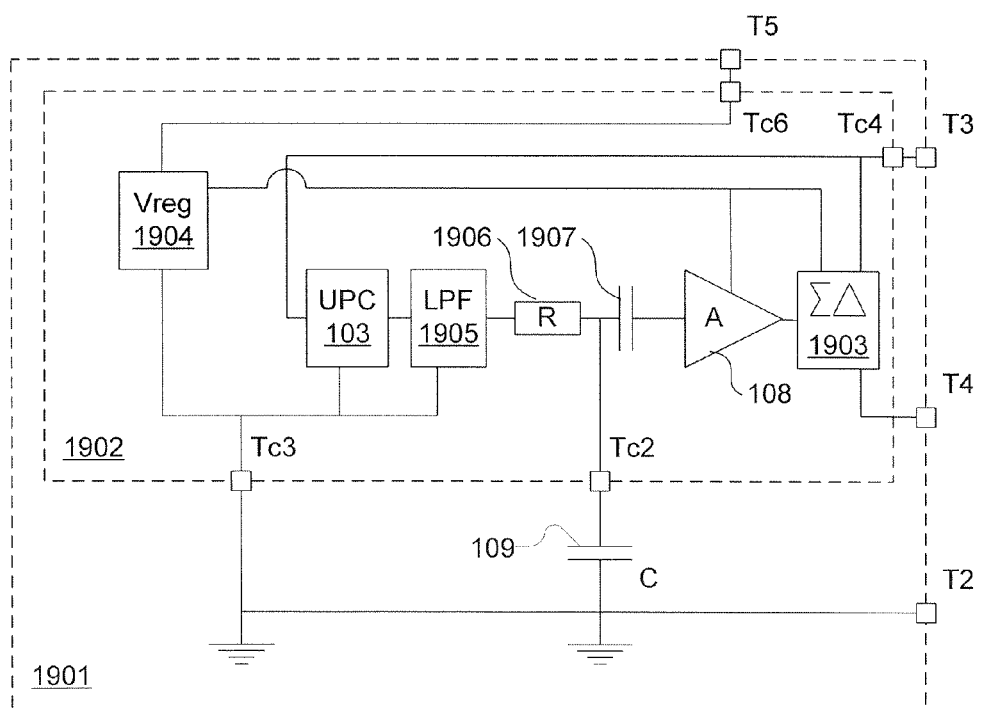
FIG. 20 shows a second embodiment of a microphone comprising an integrated circuit with a sigma-delta A/D converter.

FIG. 20 shows a second embodiment of a microphone comprising an integrated circuit with a sigma-delta A/D converter. In this embodiment, the clock-signal that controls the sigma-delta converter 1903 is also applied as an input oscillator signal to the voltage pump 103. Preferably, the voltage pump provides a 180-degrees phase shifted version of the clock signal to provide signals P1 and P2 for subsequent processing as described in the foregoing.

In an alternative embodiment a frequency divider or multiplier is provided to shift the oscillator frequency relatively between the sigma-delta converter and the voltage pump. The shared use of the externally provided clock-signal reduces the chip die area consumption.

Generally, it should be mentioned that the microphone alternatively can be coupled in a floating configuration. For instance, the microphone, Cmic, can replace the capacitor C1 or 906. The capacitor C1 or 906 can accordingly replace the microphone, Cmic.

Generally, in connection with preamplifier configurations it is noted that the preamplifier can be of different types. The preamplifier can thus be implemented as a differential amplifier providing a differential output signal. Thereby, a signal provided in response to a sound pressure on the microphone is provided to a the differential preamplifier. The differential preamplifier is characterised by having a gain characteristic with relative low gain for frequencies below an audible range and a relative high gain for frequencies in the audible range. Preferably, the gain characteristic descent as a $1^{st}, 2^{nd}, 3^{rd}, 4^{th}$, or higher order below the audible range. In addition thereto the amplifier is characterised by processing a low frequency microphone signal as a common-mode signal and a high frequency microphone signal as a differential mode signal. Thereby low frequency components are effectively suppressed. The differential output signal is provided across two terminals as a microphone preamplifier output signal.

Especially in connection with sigma-delta modulators it is important to remove low frequent signals since otherwise the low frequent signals would generate idle-mode tones in the digital signal provided by the sigma-delta converter.

Figure 21:
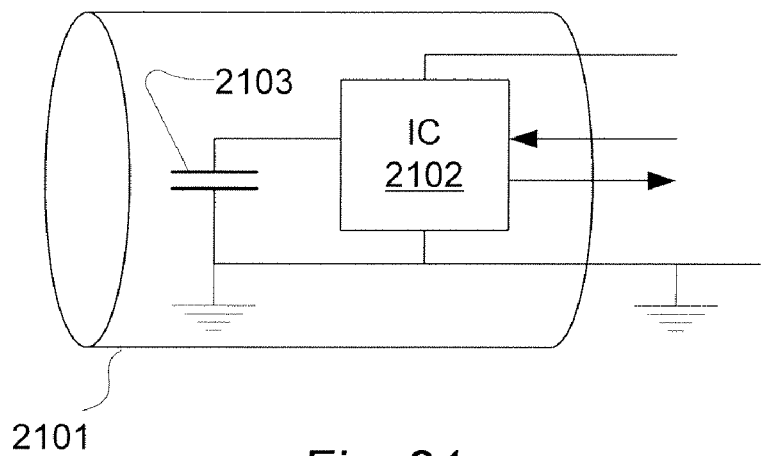
FIG. 21 shows a microphone cartridge.

FIG. 21 shows a microphone cartridge. The microphone cartridge 2101 is shown in a schematic view illustrating an integrated circuit IC, 2102 and a microphone element 2103. The integrated circuit 2102 comprises the preamplifier and voltage pump as disclosed above and is embodied on a semiconductor substrate or a single chip die.

Figure 22:
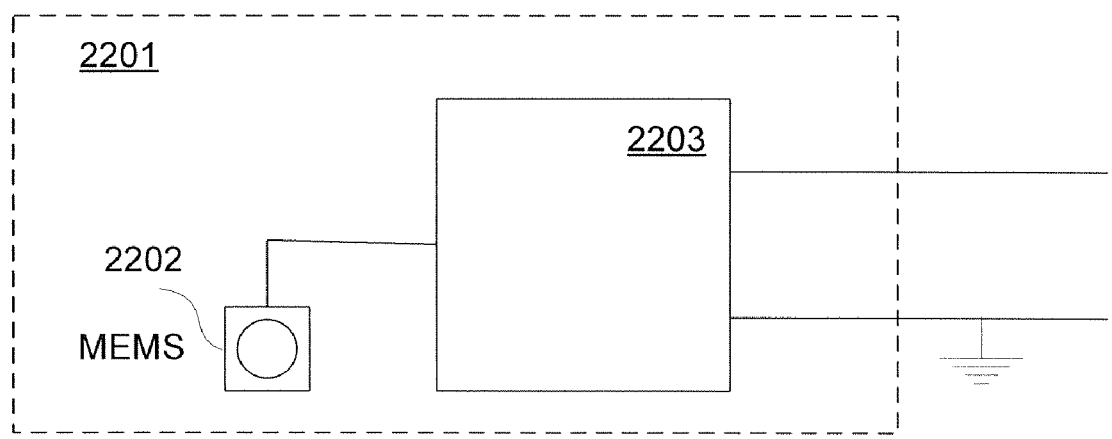
FIG. 22 shows a schematic view of a microphone with an integrated circuit and a MEMS microphone member.

FIG. 22 shows a schematic view of a microphone with an integrated circuit and a MEMS microphone element. The microphone 2201 comprises a MEMS microphone member integrated on a first substrate 2202. On a second substrate 2203 the preamplifier circuitry and the voltage pump is provided as described in the foregoing. The first and second substrates are bonded to each other to provide electrical connections.

The preamplifier circuitry comprises one of the different embodiments disclosed above i.e. comprising a voltage pump and a preamplifier. Optionally, the preamplifier is provided with a feedback circuit to provide a preamplifier with a high pass filter characteristic.

It should be noted that the MEMS microphone element, the voltage pump and the microphone preamplifier can be integrated on a single semiconductor substrate.

In a preferred embodiment the input side of the preamplifier is coupled to a limiter circuit. When the charge-pump starts up a very large signal will be present at one side of the microphone capacitor. Without a limiter, this large signal will also couple to the input of the preamplifier. This signal has a large low frequency content and will thus overload the preamplifier if it has a nominal gain at low frequencies. Such a "power on" pulse from the charge pump will be equivalent of a very large input sound pressure level. A limiter at the input of the preamplifier can be designed to clamp the start up pulse while largely not affecting normal operation. Such a limiter can be implemented by means of two diode coupled transistors or a pair of back to back coupled diodes. If the preamplifier additionally is designed to have a gain vs. frequency function which has a high pass filter function then the identified problem can easily be avoided.

Integrated circuits are characterized from discrete circuits by physically being implemented in the same silicon.

Generally, a microphone based on the principle of a capacitor, where one of the capacitor plates is a moveable membrane without an electret layer (or substantially without an electret layer) is denoted a condenser microphone.

The above features may be applied in embodiments of a preamplifier configuration that comprises a gain stage with a feedback filter, where the configuration has a relatively low gain response for frequencies below an audio band and has a relatively high and substantially flat gain response in the audio band. The audio band can be defined to be any band within the typical definition of an audio band. A typical definition can be 20 Hz to 20 KHz. Exemplary lower cut-off frequencies for an audio band can be: 20 Hz, 50 Hz, 80 Hz, 100 Hz, 150 Hz, 200 Hz, 250 hz. Exemplary upper cutoff frequencies the an audio band could be 3 KHz, 5 KHz, 8 KHz, 10 KHz, 18 KHz, 20 KHz. By substantial flat is meant gain response variations within approximately +/−1 dB; +/−3 dB; +/−4 dB; +/−6 dB. However, other additional values of variation can be used to define the term 'substantial flat'.

In the above different preamplifier configurations have been disclosed. These configurations comprise different input/output terminal configurations e.g. a two-terminal configuration. However, it should be noted that three, four or more terminals can be provided for input/output of signals to microphone and preamplifier. Especially, it should be noted that separate terminals can be provided for supply voltage (at a first terminal) and preamplifier output (at a second terminal). In case of a differential preamplifier output two terminals for the output signals can be provided in addition to a terminal for power supply.

A separate terminal is provided for a ground reference. This ground reference is typically, but not always, shared by the power supply and output signal.

The invention claimed is:

1. An integrated circuit configured to provide a microphone output signal, comprising:
a preamplifier coupled to receive an input signal, generated by either a first microphone member or a second microphone member, where one of the members is movable relative to the other microphone member;
a voltage pump to output a pumped voltage; and
a low-pass filter coupled to filter the pumped voltage from the voltage pump and to provide a bias voltage to either the first or second microphone member.

2. An integrated circuit according to claim 1, where the low-pass filter is a first order low-pass filter.

3. An integrated circuit according to claim 1, comprising a circuit which limits the voltage swing at an input of the preamplifier, where the input receives the input signal.

4. An integrated circuit according to claim 1, comprising a capacitor coupled to diminish a DC voltage level at the input of the preamplifier.

5. An integrated circuit according to claim 1, comprising a capacitor coupled serially between the preamplifier and the microphone member generating the input signal.

6. An integrated circuit according to claim 1, comprising a capacitor coupled serially between the member, which is different from the microphone member generating the input signal and a ground reference.

7. An integrated circuit according to claim 1, where the preamplifier is configured to output a signal, which is high-pass filtered by the preamplifier and a filter comprised by the preamplifier.

8. An integrated circuit according to claim 1, where the preamplifier, comprises:
a differential input stage with a first and a second input terminal and an output stage with an output terminal;
a feedback circuit, with a low-pass frequency transfer function, coupled between the output terminal and the first input terminal and integrated on the semiconductor substrate; and
where the second input terminal provides an input for a microphone signal.

9. An integrated circuit according to claim 8, where the feedback circuit is a filter with a transfer function, in the frequency domain, with a zero and a pole; wherein the zero is located at a higher frequency than the pole.

10. An integrated circuit according to claim 8 where the preamplifier has a transfer function, in the frequency domain, with a zero and a pole; wherein the pole is located in the range 0.1 Hz to 50 Hz or 0.1 Hz to 100 Hz or 0.1 to 200 Hz.

11. An integrated circuit according to claim 8, where the feedback circuit is a filter which, in the frequency domain, has a relatively high gain level below a transition frequency range and a relatively low gain level above the transition frequency range.

12. An integrated circuit according to claim 11, where the transition frequency range is located below a frequency of about 100 Hz.

13. An integrated circuit according to claim 11, where the transition frequency range is located below a frequency of 40 Hz.

14. An integrated circuit according to claim 1, where the preamplifier outputs an analogue signal; and
where the integrated circuit comprises an analogue-to-digital converter which is coupled to receive an analogue signal output by the preamplifier.

15. An integrated circuit according to claim 1, where the integrated circuit further is configured with an analogue-to-digital converter; and
wherein the voltage pump and the analogue-to-digital converter are driven by a common clock-signal.

16. An integrated circuit according to claim 14, where the analogue-to-digital converter is of the sigma delta converter type.

17. An integrated circuit according to claim 1, where the integrated circuit is configured with an oscillator driven voltage pump to provide a bias voltage to either microphone member; and
  where the oscillator is configured to draw substantially equal levels of current across signal cycles provided by the oscillator.

18. An integrated circuit according to claim 17, where the oscillator comprises paths with elements that can be charged with an electrical charge and where the paths are controlled by the oscillator to charge the different elements of the different paths alternately by a current drawn from a common source.

19. An integrated circuit according to claim 1, where the voltage pump has a first pump stage at which an oscillating signal with a voltage pulse level is pumped to a higher voltage pulse level, and a second pump stage at which a voltage level is pumped to a higher level by means of a circuit operating on the oscillator signal, provided at the first stage, with the higher voltage pulse level.

20. An integrated circuit according to claim 1, where the integrated circuit comprises:
  a first portion configured with a circuit component layout for electrical operation at or below a nominal voltage level and a second portion configured with a circuit component layout for electrical operation above the nominal voltage.

21. An integrated circuit according to claim 19, where an output signal of the first voltage pump stage is provided as a feedback signal to a circuit which maintains a fixed voltage pulse level of the signals output from the first pump stage.

22. An integrated circuit according to claim 1, where the voltage pump has a first pump stage providing an intermediate voltage and a second pump stage providing the pumped voltage from the intermediate bias voltage; and where the second pump stage comprises a voltage pump configured as a Dickson converter.

23. An integrated circuit according to claim 22, where an output signal of the Dickson converter is provided as a feedback signal to a circuit which provides a regulated voltage pulse level of the signals output from the voltage converter.

24. An integrated circuit according to claim 1, where multiple voltage converters are cascaded to provide the bias voltage, and where a further voltage converter, which matches the first converter in the cascade, is coupled to receive the same signal as the first converter and to provide a feedback signal to a circuit which maintains a fixed voltage level of the signals output from the further voltage converter.

25. An integrated circuit according to claim 1, where the voltage pump comprises capacitors implemented as Metal capacitors.

26. An integrated circuit according to claim 1, where the voltage pump comprises diodes implemented as Poly-diodes.

27. An integrated circuit according to claim 1, where the voltage pump comprises diodes implemented as diffusion diodes in an N-well.

28. A microphone comprising an integrated circuit according to claim 1.

29. A microphone according to claim 28, where the microphone is a condenser microphone.

30. A microphone according to claim 28, where the microphone is a MEMS microphone.

31. The integrated circuit according to claim 1, wherein the preamplifier, voltage pump and at least a portion of the low-pass filter are embodied on a single semiconductor substrate for integration with a microphone element.

32. The integrated circuit according to claim 1, wherein the preamplifier, voltage pump and at least a portion of the low-pass filter are embodied on a single semiconductor substrate for integration with a microphone element in a microphone cartridge.

* * * * *